AUTO-SELECTING CROSS-BAR TELEPHONE SYSTEM

Filed Dec. 11, 1953 9 Sheets-Sheet 1

*INVENTOR.*
RUDOLPH F. STEHLIK

*BY* Wm. Walter Owen.

ATTY.

Dec. 16, 1958 R. F. STEHLIK 2,864,890

AUTO-SELECTING CROSS-BAR TELEPHONE SYSTEM

Filed Dec. 11, 1953 9 Sheets-Sheet 2

INVENTOR.
RUDOLPH F. STEHLIK
BY [signature]

ATTY.

Dec. 16, 1958 R. F. STEHLIK 2,864,890

AUTO-SELECTING CROSS-BAR TELEPHONE SYSTEM

Filed Dec. 11, 1953 9 Sheets-Sheet 3

INVENTOR.
RUDOLPH F. STEHLIK

BY [signature]

ATTY.

INVENTOR.
RUDOLPH F. STEHLIK
BY Wm. Walter Owen.
ATTY.

INVENTOR.
RUDOLPH F. STEHLIK
BY Wm Walter Owen
ATTY.

AUTO-SELECTING CROSS-BAR TELEPHONE SYSTEM

Filed Dec. 11, 1953

9 Sheets-Sheet 6

INVENTOR.
RUDOLPH F. STEHLIK

BY Wm. Walter Owen.

ATTY.

FIG. 9 REGISTER MISC. RLYS.

INVENTOR.
RUDOLPH F. STEHLIK
BY Wm. Walter Owen
ATTY.

AUTO-SELECTING CROSS-BAR TELEPHONE SYSTEM

Filed Dec. 11, 1953 9 Sheets-Sheet 8

FIG. 10 REGISTER CTG. RLYS

INVENTOR.
RUDOLPH F. STEHLIK
BY Wm. Walter Owen
ATTY.

AUTO-SELECTING CROSS-BAR TELEPHONE SYSTEM

Filed Dec. 11, 1953 9 Sheets-Sheet 9

INVENTOR.
RUDOLPH F. STEHLIK
BY Wm. Walter Owen
ATTY.

United States Patent Office 2,864,890

Patented Dec. 16, 1958

2,864,890

AUTO-SELECTING CROSS-BAR TELEPHONE SYSTEM

Rudolph Frank Stehlik, Antwerp, Belgium, assignor to General Telephone Laboratories, Incorporated, a corporation of Delaware Application December 11, 1953, Serial No. 397,629

21 Claims. (Cl. 179—22)

This invention relates to telephone systems and is particularly concerned with automatic telephone systems employing cross-bar switches of the general type shown and described in United States Patent 2,021,329 issued to J. N. Reynolds on November 19, 1935.

Cross-bar switches of this type consist essentially of a large number of spring contact sets arranged in horizontal and vertical rows, and means including a number of magnet-controlled horizontal and vertical operating members or rocking bars for operating said contact sets as required. In some switches of this type, such as the foregoing, the horizontal operating members are rotatable in two directions, so that either of two contact sets may be operated, at the intersecting point of any two horizontal and vertical members, by rocking the corresponding horizontal member in one direction or the other, and then rocking the corresponding vertical member in its single direction.

In such switches, the horizontal operating members are provided with flexible selecting fingers corresponding to said vertical rows of contact sets. The rocking of any horizontal operating member causes the selecting fingers thereof to select a horizontal row of contact sets by interposing themselves between said contact sets and the corresponding vertical operating members. When a vertical operating member is then operated, it causes the operation of the proper contact set at the intersection of the two operated bars, by pressing the corresponding selecting finger against a contact-actuating member associated with these contacts. Since one contact of each pair of switching contacts is multiplied vertically and the other horizontally, and connected to incoming and outgoing circuits, a particular incoming circuit is now connected to a particular outgoing circuit. The horizontal bar is then released, and the connection remains held by the vertical bar alone. Upon the release of the operated horizontal bar, all of the associated selecting fingers, except the one held in place by the operated vertical bar, are restored to their normal positions.

One of the features of such systems is the use of common control circuits for all of the various path-selecting and trunk-hunting operations. This simplifies the cross-bar switches by eliminating relays therefrom, but it also results in the use of large quantities of common equipment.

The main object of the present invention is the provision of a cross-bar system in which the calls are extended through the cross-bar switches primarily by auto-selection rather than by marker indication as in the conventional procedure.

A feature of the invention is accordingly the provision of means whereby each call seeks its own free path through the different ranks of switches with a minimum of external aid, and a resultant considerable reduction in the amount of external common equipment required, in addition to the switches themselves and the necessary line and repeater circuits. This also results in a very considerable reduction in the actual operating time of the switches, and thus facilitates the rapid handling of calls.

Other objects and features of the invention will be apparent from the description and claims following, together with the accompanying drawings, comprising Figures 1 to 12 inclusive, which shows sufficient of the equipment, in circuit diagram form, as applied to a typical 1000 line exchange, to enable the invention to be properly described and understood.

Figures 5, 6:
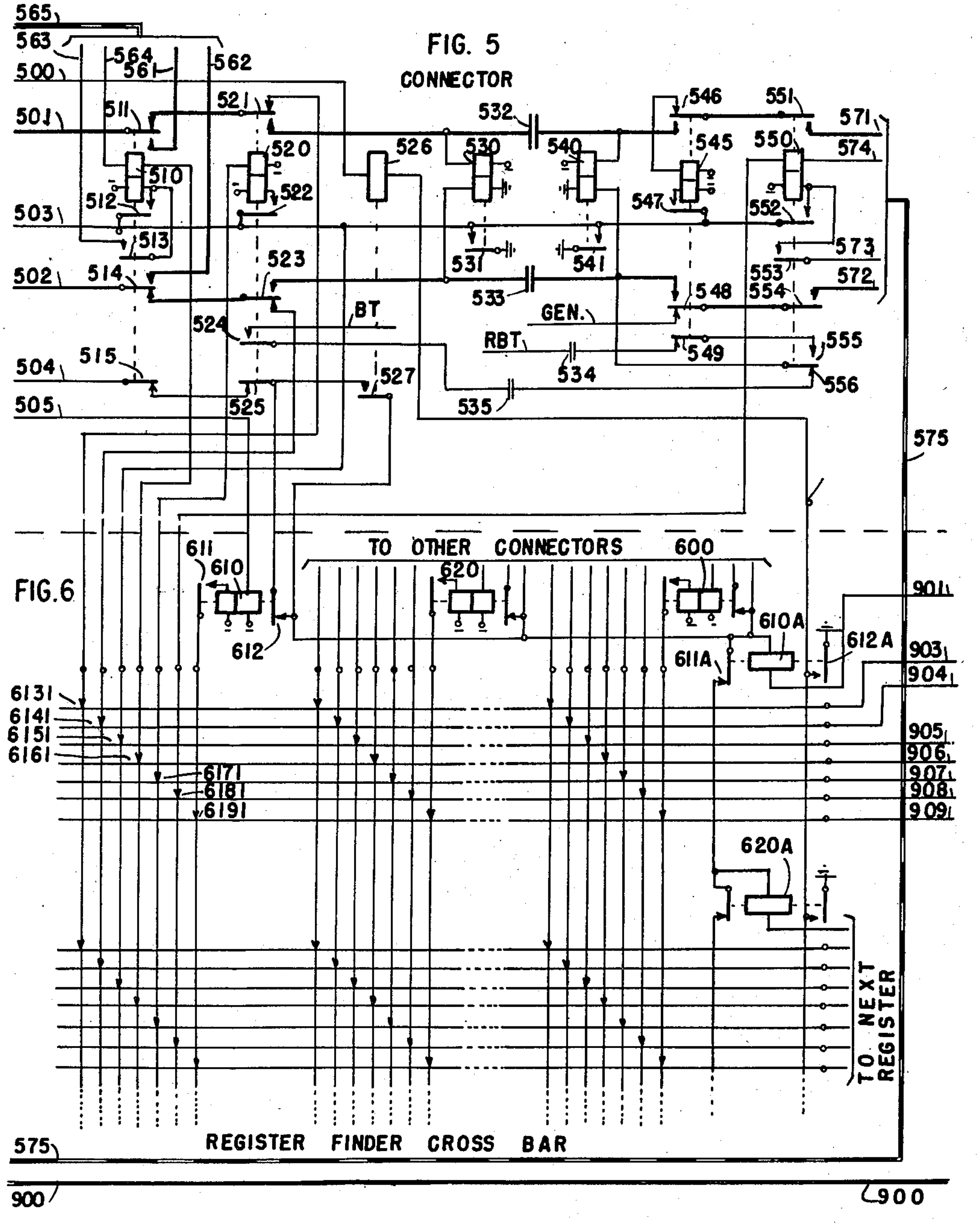
Fig. 5 shows one of a plurality of connecting or connector circuits, each directly accessible through the cross-bar contacts of one of the secondary switches, and whose function it is to extend the connection from a calling line back through the secondary and primary cross-bar switches to the called line or trunk.

Fig. 6, which is shown on the same sheet as Fig. 5, represents a register finder cross-bar switch, whose incoming circuits are directly connected to different ones of the connectors, and whose function it is to connect a calling line to an idle register.

Figures 7, 8:
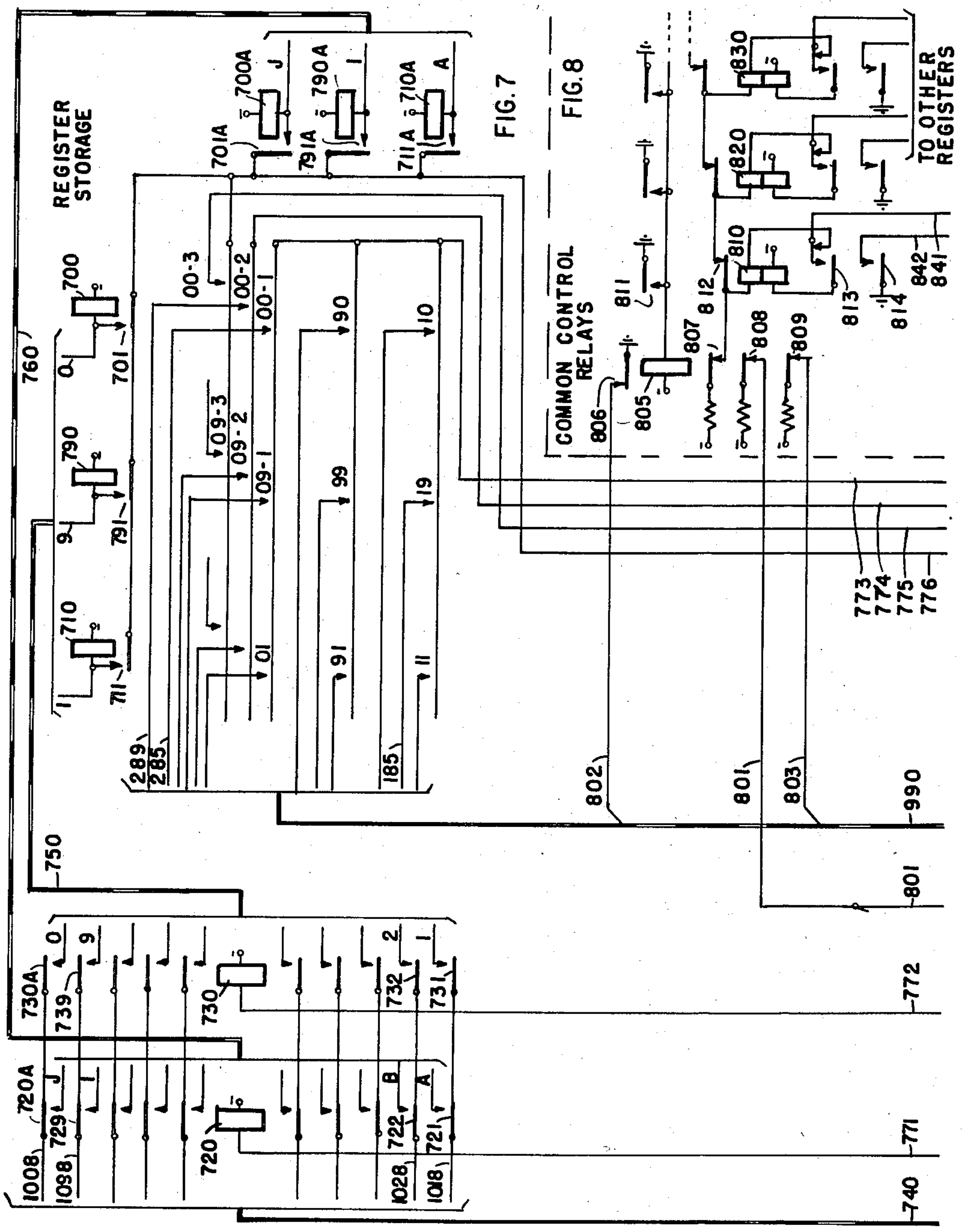

Fig. 7 shows a storage cross-bar switch forming part of the register, and whose function it is to store the group selecting digits dialled to the register, and to utilize them for the operation of the proper line or trunk circuit tens relay.

Fig. 8, which is drawn on the same sheet as Fig. 7, shows a small group of common control relays associated with the registers, and whose function it is to block or disable certain switch start circuits momentarily during the actual operation of the switches to select the called line.

Figure 9:
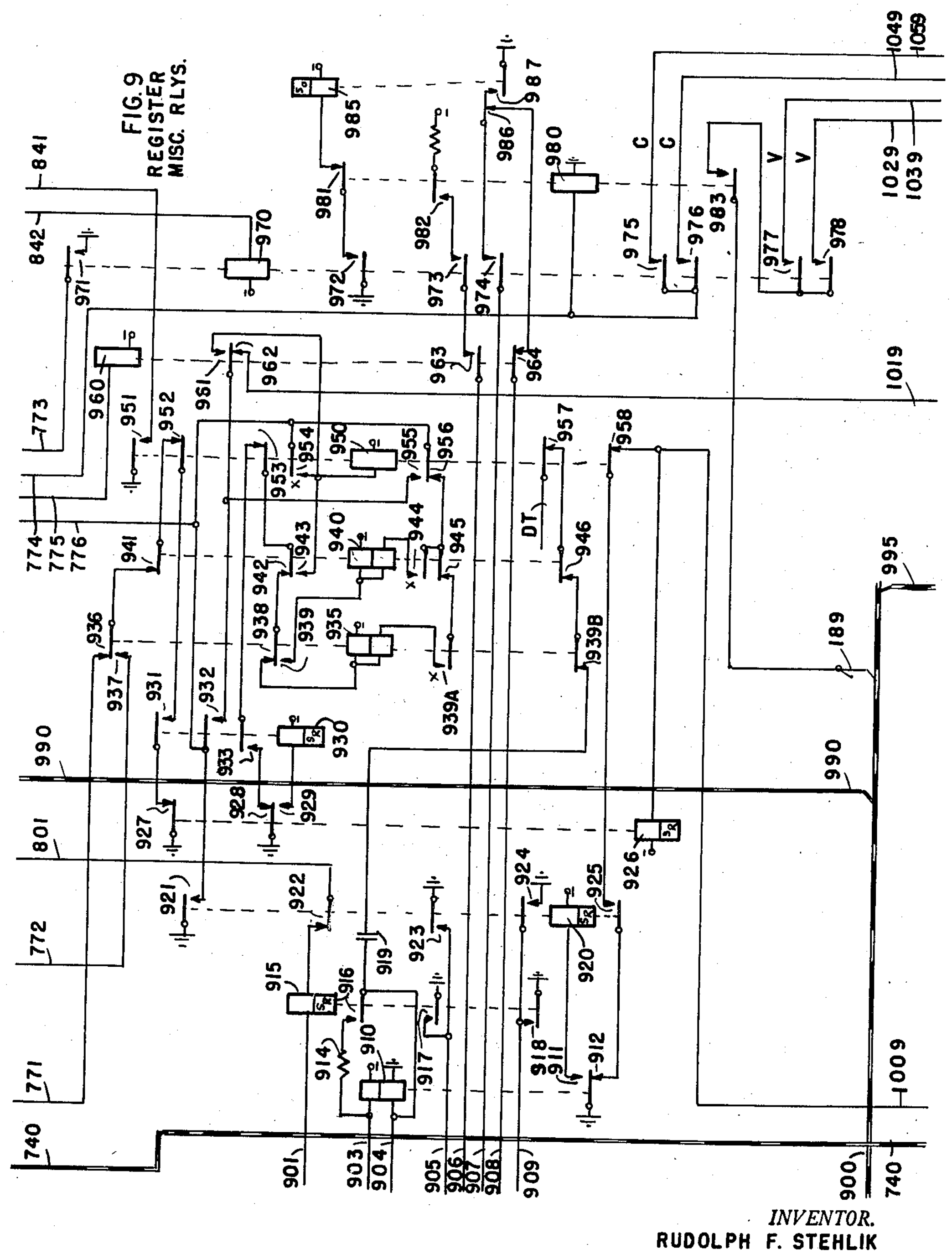

Fig. 9 shows the miscellaneous control relays for the register.

Figure 10:
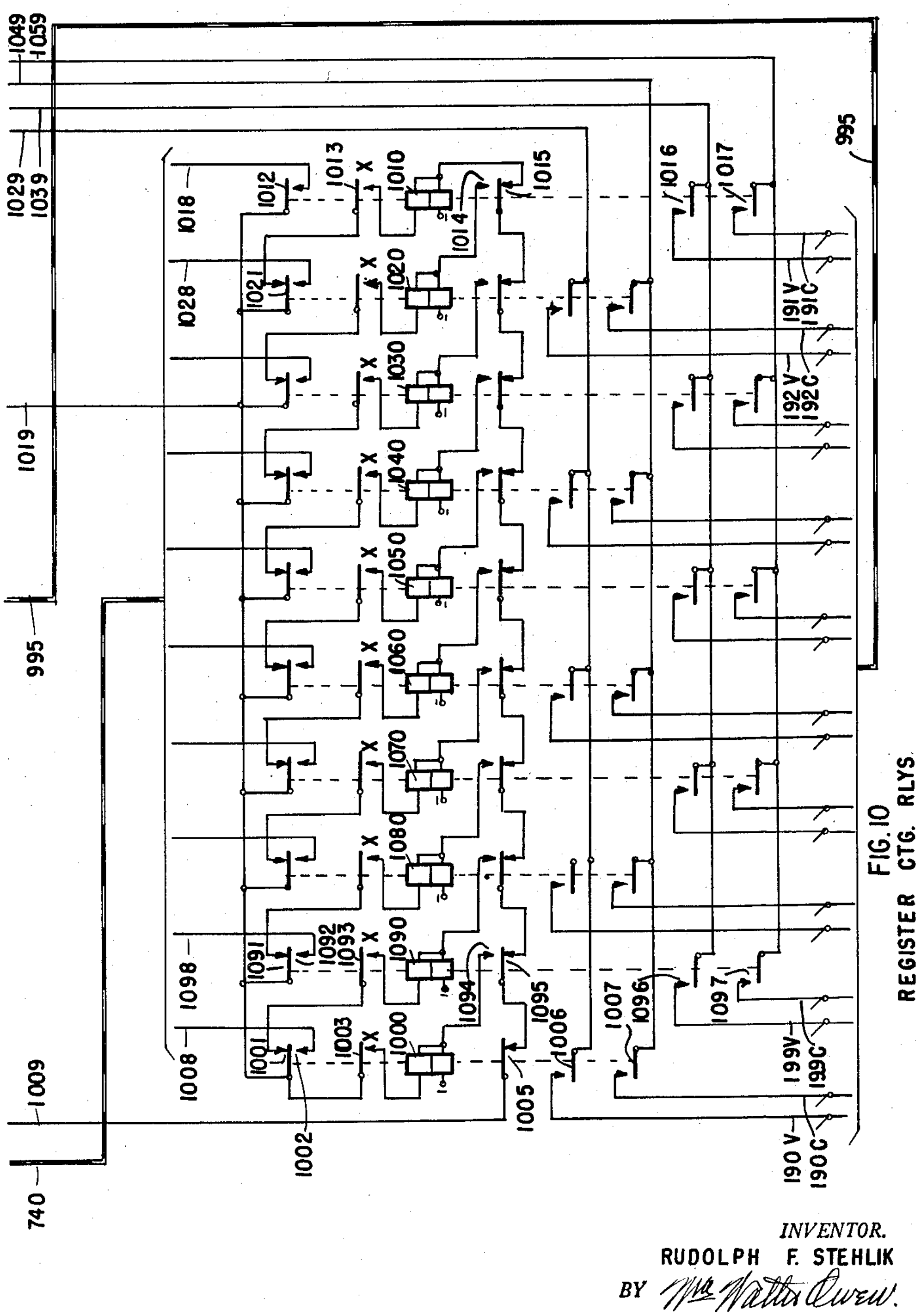

Fig. 10 shows the register counting relays, which receive the dial pulses.

Figures 11, 12:
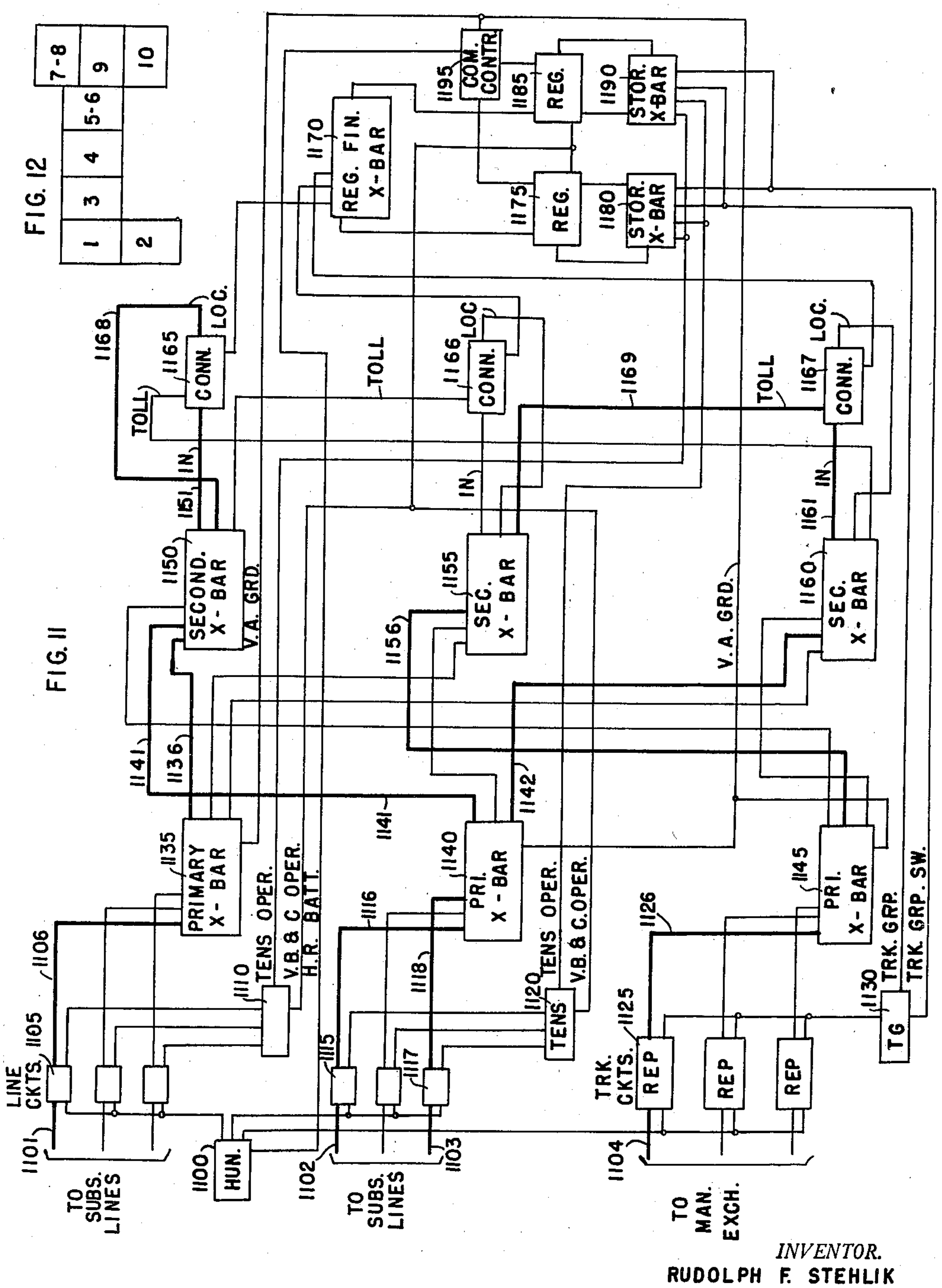

Fig. 11 shows a partial trunking diagram illustrating typical interconnections between the different units of equipment comprising the invention.

Fig. 12 shows how Figs. 1 to 10 should be arranged with respect to one another to provide a continuous circuit diagram illustrating the invention.

Figure 1:
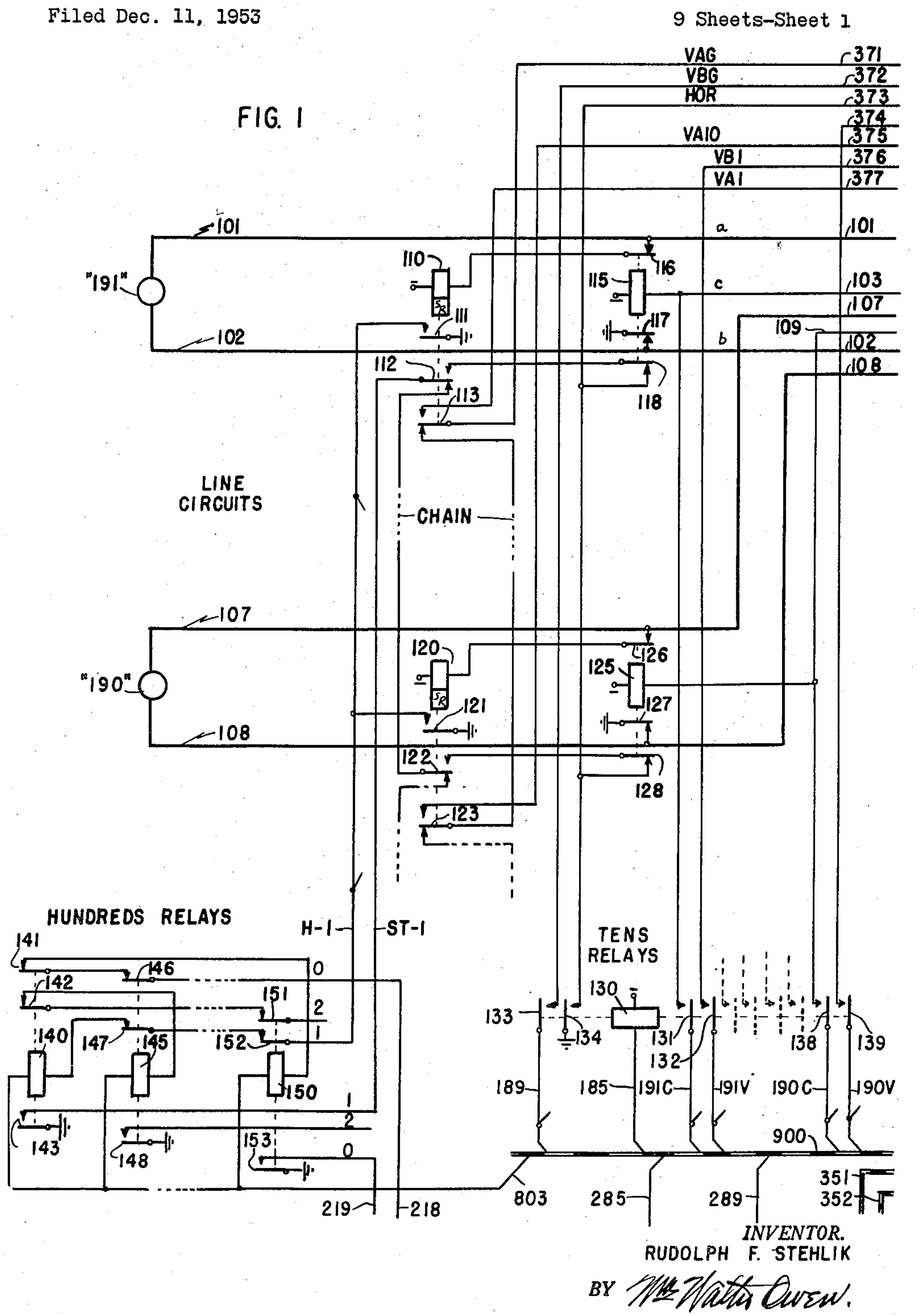
Fig. 1 shows a pair of local subscriber lines, together with their associated line circuits, including line and cut-off relays, and a number of associated tens and hundreds relays.

With further reference to the drawings, Fig. 1 shows the first and last line circuits of a ten line group serving lines 191 to 190 for example, and each consisting of a line relay such as 110 or 120, and a cutoff relay such as 115 or 125. A hundreds relay such as 140, 145 or 150 is also provided for each hundred lines for designating the calling line group, and a tens relay such as 130 for each ten lines for designating the called line group. Only the first, second and tenth hundreds relays are shown, the others being similarly arranged.

Figure 2:
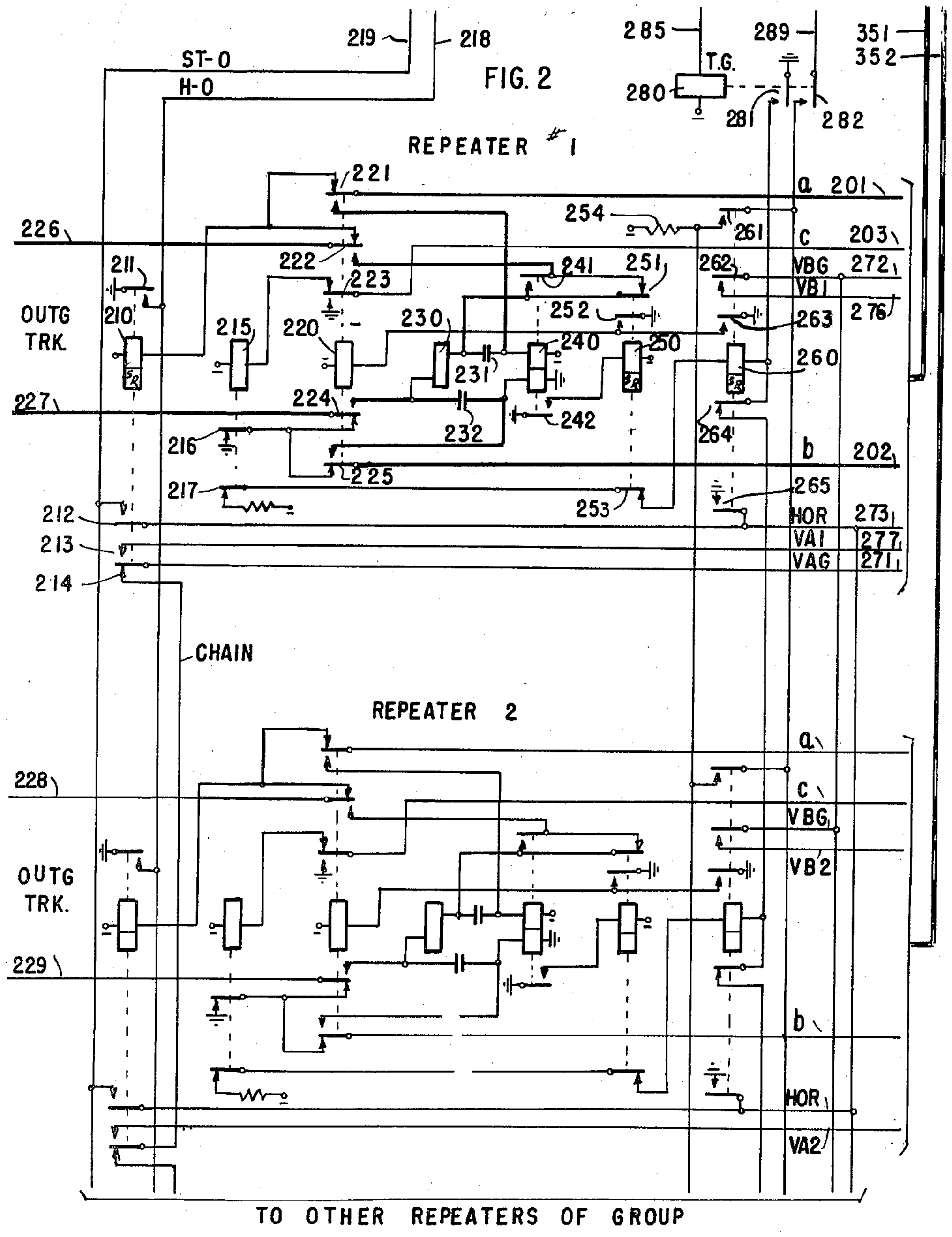
Fig. 2 represents a group of repeater or trunk circuits leading to a neighboring manual exchange. There may be from one to a considerable number of repeaters in such a group.

In Fig. 2 are shown the first two repeater or trunk circuits of a group of two-way trunks, for giving access to a neighboring manual exchange, in response to a common call number. Access to an automatic exchange can be provided in similar manner by the addition of pulse repeating circuits to the repeaters. Such circuits have not been illustrated however, as they would have no particular bearing on the invention. More than one group of such repeaters may be provided, but a group or tens relay such as 280, which has a similar function to that of tens relay 130 in Fig. 1, must be provided for each group. Multiple connections such as 218, 219 must also be made to the proper hundreds relay of Fig. 1. When a local calling line is extended to these repeaters, an idle repeater is selected automatically, by means within the repeaters.

Figure 3:
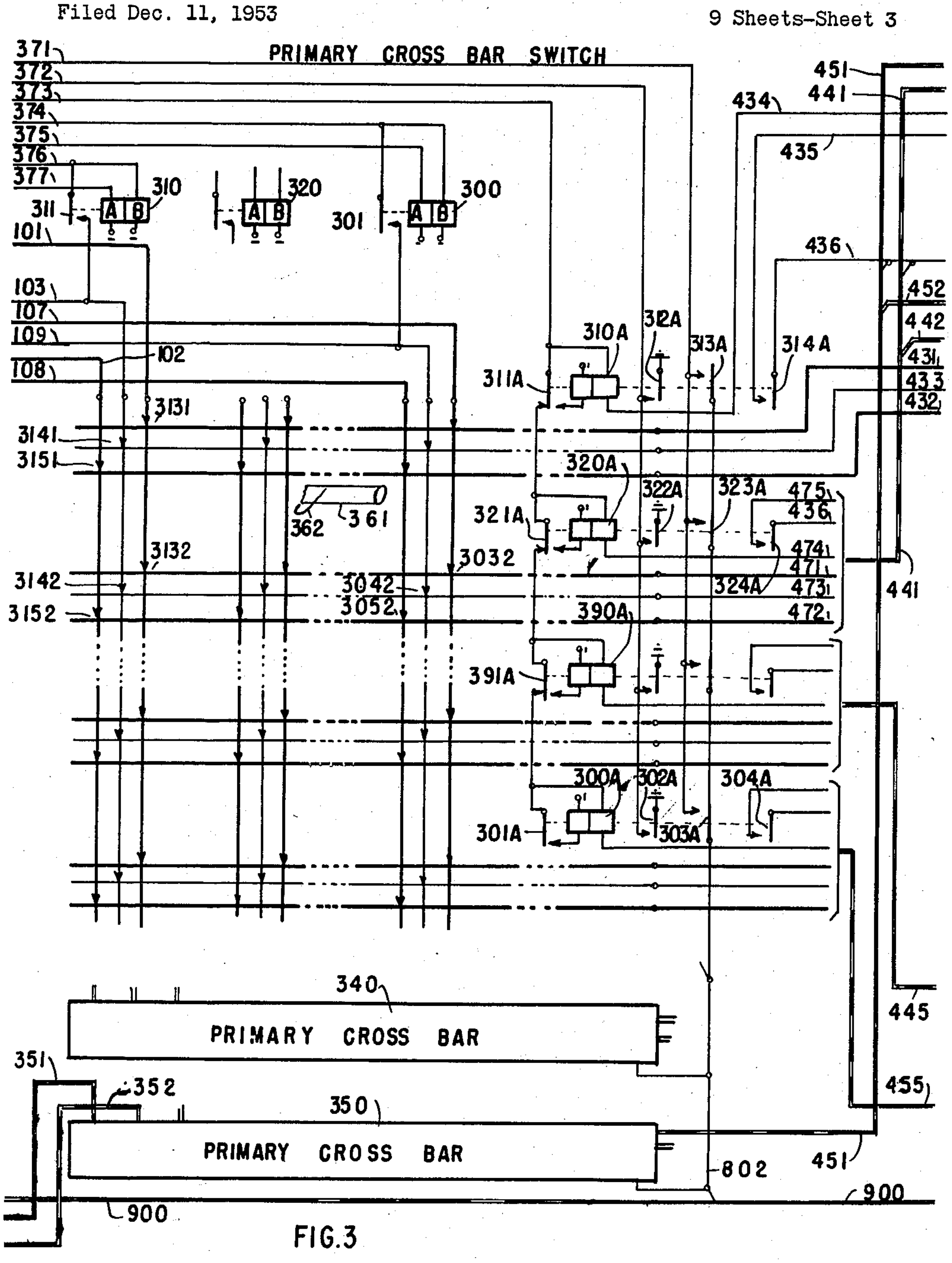
Fig. 3 represents a group of primary cross-bar switches whose incoming circuits are directly connected to various ones of the subscriber line and trunk circuits.
Figure 4:
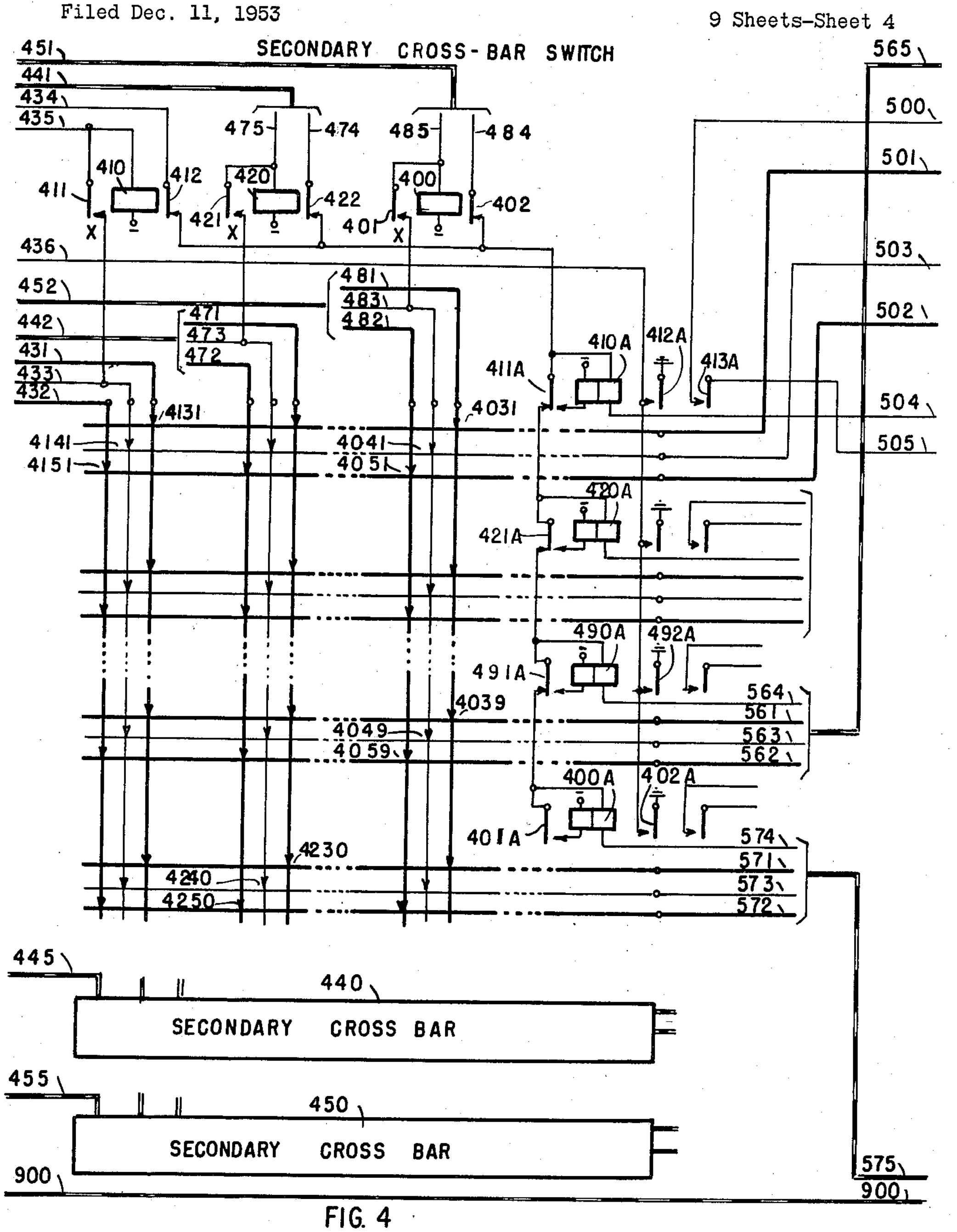
Fig. 4 represents a group of secondary cross-bar switches whose incoming circuits are directly accessible through the multipled contacts of the primary switches.

The details of construction of the cross-bar switches of this system, such as shown in Figs. 3 and 4, are not important, although a separate horizontal bar and magnet for each horizontal row of contact sets is preferred. Also, any number of horizontal and vertical rows of contact sets may be employed in each switch, although, for the main switches at least, an arrangement of twenty vertical rows and ten horizontal rows is assumed. A preferred arrangement for the horizontal bars and selecting fingers is also shown in Fig. 3 at 361, 362. With this arrangement, the bars 361 are mounted well back of the tips of the contact springs, with the selecting fingers 362 projecting forward, so as to leave the contact springs accessible from the front for inspection and adjustment.

In the partial circuit diagrams of the primary and secondary cross-bar switches shown in the upper parts of Figs. 3 and 4, only the first, second and tenth vertical or inlet magnets, such as 310, 320, 300, out of the twenty required are shown, while at the right are shown the first, second, ninth and tenth horizontal or outlet magnets, such as 310A, 320A, 390A, 300A. Each magnet directly controls a small group of contacts individual to itself, such as 311, 311A, and indirectly controls the multipled switching contacts such as 3131, 3141, 3151 through the various selecting fingers, in the manner previously described. As illustrated, the incoming circuits are connected to the vertical multiples, and the outgoing circuits to the horizontal multiples. With respect to called lines however, which are reached through the same switches, certain of these outgoing circuits become in a sense incoming circuits, and the incoming circuits become outgoing circuits, as will be seen.

The register finder cross-bar switch of Fig. 6 is generally similar to those of Figs. 3 and 4, but each cross-bar contact set consists of seven pairs of contacts instead of only three. The first, second and tenth vertical magnets are shown as before, but only the first and second horizontal magnets 610A and 620A are illustrated.

The register storage cross-bar switch of Fig. 7 is also of the same general type as the others, but only ten vertical magnets and ten horizontal magnets are employed, of which only the first, ninth and tenth are shown. For convenience in drawing, the incoming circuits are shown connected to the horizontal multiple, and the position of the horizontal magnets is reversed, with the first magnet 710A at the bottom and the tenth magnet 700A at the top. Since the outgoing circuits are in general individual circuits, there is no vertical multiple, although some of the vertical contacts may be multipled horizontally, for a purpose to be described later.

The general method of operation, with particular reference to Fig. 11, is as follows. When a local subscriber line, such as 1101 in the upper left hand corner, initiates a call, the line relay of the associated line circuit 1105 operates, and causes the operation of a corresponding hundreds relay in the hundreds relay group 1100. The operated hundreds relay thereupon passes a start ground back to the operated line relay, which forwards it to the primary cross-bar switch 1135 serving this group of lines. This ground automatically finds a free path through the horizontal magnets of this primary switch and one of the secondary switches such as 1150, 1155, 1160, through an idle connector such as 1165, 1166, 1167, through the horizontal magnets of the register finder 1170, and through a free register such as 1175, 1185 to battery at the common control circuit 1195. The selected horizontal magnets operate and the register is seized, all at the same time in this circuit, and the operated horizontal magnets immediately operate the appropriate vertical magnets in the primary switch 1135, the selected secondary switch such as 1150, and the register-finder 1170. These vertical magnets thereupon close the appropriate contact sets to extend the connection from the calling line to the seized connector and register, such as 1165 and 1175, and release the corresponding horizontal magnets. The register then returns dial tone to the calling line, and operates the line cutoff relay in line circuit 1105. The associated line and hundreds relays thereupon release, and clear the way for the next call. If several calls are initiated at exactly the same instant, they will be extended to the registers one at a time in a particular order, with the aid of certain chain circuits shown in Fig. 1. Since however, this operation is completed in a small fraction of a second, of the order of one-tenth of a second or less, this will result in no noticeable delay, in the majority of cases, between the initiation of a call and the receipt of dial tone.

The calling party, upon hearing the dial tone, proceeds to dial. Assuming for example that the call is intended for another local line, such as 1102, at the left center, the calling party will dial a three digit call number. These digits operate the pulse counting relays of the seized register 1175, which utilizes the first two digits to operate corresponding horizontal and vertical or outlet and inlet magnets in the associated storage cross-bar switch 1180. The storage switch in turn, prepares the operation of the tens relay indicated by the two received digits. The third digit is also received by the counting relays, and is stored thereby momentarily. As soon as this digit has been received, the common control relays 1195 disable the call initiating circuits momentarily, and the storage switch operates the proper tens relay in the rectangle 1120. This causes the operation of the cutoff relay in line circuit 1115, from the counting relays, and at the same time forwards a start ground to the primary cross-bar switch 1140 serving this group of lines. This ground now automatically finds a free path through the horizontal magnets of this primary switch and a secondary switch such as 1150 connected to the local outward circuit of the held connector 1165, and over this circuit and the held register finder and register to battery. The selected horizontal magnets then operate, and in conjunction with the operated register counting relays, cause the operation of the appropriate vertical magnets, in the cross-bar switches 1140 and 1150. These vertical magnets thereupon extend a connection from the connector 1165 to the called line 1102 and release the horizontal magnets. At the same time, the connector 1165 releases the register finder, the register, and the common control relays, and proceeds to ring the called line. When the called line answers, connector 1165 completes a talking connection between the lines 1101 and 1102, which is indicated by the heavy black lines 1106, 1136, 1151, 1168, 1141 and 1116 extending between the line circuit 1105, the primary cross-bar switch 1135, the secondary cross-bar switch 1150, the connector 1165, the secondary cross-bar switch 1150 again, the primary cross-bar switch 1140, and the line circuit 1115.

An outgoing call is in general similar to the foregoing, except for circuit details, as will be seen later, and the fact that the seizure of an outgoing trunk requires the dialling of only two digits instead of three. Assuming for example that subscriber line 1103 wishes to make such a call, the removal of the receiver will cause the operation of the line relay of the associated line circuit 1117 and the latter, together with the corresponding hundreds relay in the hundreds relay group 1100, will forward start ground to the primary cross-bar switch 1140. This ground then finds a free path through the horizontal magnets of this primary switch and one of the secondary switches such as 1160 for example, through an idle connector such as 1167, through the horizontal magnets of the register finder 1170, and through a free register such as 1185 to battery in the common control circuit 1195. The selected horizontal magnets operate and the register is seized as before, whereupon the appropriate vertical magnets operate to extend the connection to the seized register, while the horizontal magnets release. The register then returns dial tone, and operates the line cutoff relay in line circuit 1117, which causes the release of the line and hundreds relays.

The calling party now dials the required two-digit number assigned to the trunk group leading to the desired exchange, such as the trunk group shown at the lower left in Fig. 11, which digits are received by the counting relays of register 1185 and passed thereby to the associated storage cross-bar switch 1190. The register and storage switch now cause the common control relays 1195 to disable the call initiating circuits momentarily, and operate a trunk tens relay corresponding to the desired trunk group in the rectangle 1130 at the lower left. An idle one of the associated repeaters, such as 1125, is thereupon seized automatically, and forwards a start ground to the primary cross-bar switch 1145 serving this group of trunks. This ground automatically finds a free path through the horizontal magnets of this primary switch and a secondary switch such as 1155 connected to the trunk outward circuit of the held connector 1167, and over this circuit and the held register-finder and register to negative battery. The selected horizontal magnets operate in the switches 1145 and 1155, and in conjunction with the seized repeater, cause the operation of the appropriate vertical magnets in these switches, while the held register and the common control relays are released. The connection between the calling line 1103 and the called trunk 1104 is now complete, and is indicated by the heavy lines 1118, 1142, 1161, 1169, 1156 and 1126 extending between the line circuit 1117, the primary cross-bar switch 1140, the secondary cross-bar switch 1160, the connector 1167, the secondary cross-bar switch 1155, the primary cross-bar switch 1145, and the repeater 1125.

Incoming calls come in over a particular trunk to a particular repeater, which acts like a line circuit to extend the call in a manner similar to that described for a local call.

It should be understood that the trunking arrangement shown in Fig. 11 is merely illustrative, and that the various trunking circuits may be distributed among the various units of equipment in many different ways. In practice the method of interconnecting will depend largely on cost and traffic considerations.

The equipment and the general method of operation having been described, the details of the circuit operation will now be developed, for both local and trunk calls, with particular reference to Figs. 1 to 10 inclusive.

*Local call*

Let it be assumed that local subscriber "191" in Fig. 1 wishes to call local subscriber "190" also shown in Fig. 1. When subscriber "191" removes his receiver or handset, line relay 110 is caused to operate from ground through contacts 117 over line wires 102 and 101, and through contacts 116 and the winding of relay 110 to battery. Relay 110 upon operating, at break contacts 112 and 113 opens the horizontal and vertical chain circuits from the succeeding line relays of the same hundreds group, at make contacts 112 and 113 prepares its own horizontal and vertical operating circuits to the associated primary cross-bar switch, and at make contacts 111 closes a circuit to the first hundreds relay 140 from ground at contacts 111, through contacts 152, 147 and similar contacts on the intervening hundreds relays not shown, winding of relay 140, and wire 803 in the cables 900 and 990 to resistance battery through contacts 809 of the common control relay 805.

Hundreds relay 140 operates over this circuit, and at contacts 141, 142 and other similar contacts not shown, opens the operating circuits of the other hundreds relays. Relay 140 also, at contacts 143 connects horizontal start ground to contacts 112 of the line relay, which ground is forwarded through contacts 112 and 118 to start wire 373, from whence it finds a free path to an idle connector and register, which path will be assumed to be as follows: right winding of the primary switch horizontal magnet 310A, wire 434, vertical magnet contacts 412 in the secondary switch, right winding of the secondary switch horizontal magnet 410A, wire 504, connector contacts 515, 525, vertical magnet contacts 612 in the register-finder switch, winding of the register-finder horizontal magnet 610A, wire 901, winding of register relay 915, contacts 922, and wire 801 to resistance battery through contacts 808 of common control relay 805.

The horizontal magnets 310A, 410A and 610A all operate in this circuit, and raise their selecting fingers. Relay 915 also operates, and closes its contacts. The horizontal magnets, at their contacts 311A, 411A, and 611A disconnect the succeeding horizontal magnets, and at contacts 313A, 314A, 412A, 413A and 612A operate the corresponding vertical magnets 310, 410 and 610 and connector relay 526. The circuit for the primary switch vertical magnet 310 is from ground at contacts 806 of common control relay 805, over wire 802 in cables 990 and 900, through contacts 313A, wire 371, contacts 113, wire 377, and the left winding of magnet 310 to battery. The circuit for vertical magnet 410 is from ground through contacts 412A, wire 436, contacts 314A, wire 435, and the winding of magnet 410 to battery. The circuit for vertical magnet 610 is from ground through contacts 612A, winding of connector relay 526, wire 500, contacts 413A, wire 505, and the right winding of magnet 610 to battery. The vertical magnets accordingly close the cross-bar contacts 3131–3151, 4131–4151, 6131–6191, and thereby extend the talking and test wires of the calling line to the register, while connector relay 526 shunts break contacts 612 on vertical magnet 610. In the register, the operation of relay 915 grounds the test and hold wires 905 and 909 at contacts 917, 918, and at contacts 916 operates pulsing relay 910, through resistor 914. Relay 910 in turn, at contacts 911 operates release relay 920, and the latter at contacts 923 and 924 connects additional grounds to the test and hold wires 905 and 909, preparatory to the release of relay 915. Release relay 920 also, at contacts 925 prepares the register pulsing circuit, and at contacts 922 opens the circuit through relay 915 and the horizontal magnets.

Closure of the cross-bar multiple contacts has a number of effects. First, vertical magnet 610 in the register finder is locked operated from register ground on hold wire 909, through contacts 6191 and 611. Second, the primary and secondary vertical magnets 310 and 410 are locked operated from register ground on test wire 905 through contacts 6151, test wire 503, contacts 4141 and 411 and magnet 410 to battery, and thence over test wire 433 and through contacts 3141 and 311 to battery through the right winding of relay 310. Third, line cutoff relay 115 of the calling line is operated in a branch of the last traced circuit, over test wire 103. This disconnects line relay 110, which being slightly slow to release, restores after a brief delay and restores the operated hundreds relay 140. Fourth, a loop circuit is extended from the calling line to register relay 910 as follows: line wires 101, 102, primary switch contacts 3131, 3151, wires 431, 432, secondary switch contacts 4131, 4151, wires 501, 502, connector contacts 511, 514, 521, 523, register finder contacts 6131, 6141, and wires 903, 904 to battery and ground through relay 910. The latter relay now holds in this circuit independently of relay 915, which then releases, together with the various horizontal magnets and connector relay 526. As soon as the calling line loop is thus extended to the register, the latter impresses dial tone thereon, from the dial tone wire DT at the lower center in Fig. 9, through contacts 957, 946, 939B, and condenser 919.

The calling party, on hearing the dial tone, proceeds to dial the number "190" of the wanted line. The register pulsing relay 910 follows the pulses, and in response to the first digit "1" releases and reoperates once to send impulse over the register pulsing circuit to the counting relays. The circuit for this impulse is from ground through contacts 912, 925, 958, wire 1009, the series contacts such as 1005, 1095 and 1015 on the counting relays, and the lower winding of counting relay 1010 to battery. Relay 1010 operates partly, and closes its preliminary make contacts 1013. The slow to release transfer relay 926 also operates in multiple with this circuit, and releases after a short delay following the reoperation of pulsing relay 910. The operation of relay 926 causes the operation of slow to release relay 930. Relay 930 in turn, extends ground from contacts 921 through contacts 932, 962, 1021 and 1013 to the upper winding of counting relay 1010. This is without effect at the moment however, since this winding now has ground on both terminals. Release relay 920, being also slow to release, remains operated during all dial pulses.

Upon the reoperation of pulsing relay 910 after the first impulse, contacts 911 thereof re-energize release relay 920, while contacts 912 open the original operating circuit to counting relay 1010, and to relay 926. This removes the shunt from the upper winding of relay 1010 which now operates fully and locks with both windings in series, from ground through contacts 921, 932, 962, 1021, 1013. Relay 1010 thereupon, at contacts 1015 and 1014 disconnects itself from the pulsing circuit and connects up counting relay 1020 in its place. This is without effect however, in the present instance.

Transfer relay 926 also restores, after a short delay period, and opens the circuit to relay 930, which also releases, after a further short delay period. During the interval between the release of these two relays, circuits are closed to the sequence and storage relays 935 and 720. The first circuit is from ground through contacts 928, 933, 953, 942, 938, and the upper winding of sequence relay 935, which operates only partly, to close its preliminary make contacts 939A. The second circuit is from ground through contacts 927, 931, 952, 941, 936, wire 771, and the winding of the storage-connect relay 720 to battery. Relay 720 thereupon operates fully, and at contacts 721 completes a circuit to the storage switch horizontal magnet 710A, from ground through contacts 921, 932, 962, wire 1019, contacts 1012, wire 1018 in cable 740, contacts 721, wire A in cable 760, and the winding of magnet 710A to battery. Magnet 710A accordingly raises its selecting fingers, not shown, and at contacts 711A locks over wire 776, to ground at contacts 921 of release relay 920. Transfer relay 930 now restores, and at contacts 931 and 932 opens the circuits of relays 720 and 1010 which release. Relay 930 also, at contacts 933 opens the original circuit to sequence relay 935. This removes a shunt from the lower winding of this relay, which now operates fully, with both windings energized in series, from ground through contacts 921, 956, 945 and 939A, and prepares operating circuits for the storage-connect and sequence relays 730 and 940. Contacts 939B at the same time open the dial tone circuit.

In response to the second digit "9" pulsing relay 910 releases and reoperates nine times, and passes nine impulses to relay 926 and the counting relays. Relays 926 and 930 operate as before on the first pulse, and release in sequence after the last pulse, while the counting relays take nine steps. Relay 1010 operates partly on the closure of the first pulse and then completely on the cessation of the pulse as before. Relay 1020 operates similarly from the second pulse, and upon its complete operation its upper contacts 1021 unlock and release relay 1010. The other counting relays respond similarly to the remaining pulses, so that after the ninth and last pulse, counting relay 1090 is locked operated, and all of the other counting relays are in their normal position.

Transfer relay 926 again restores after a short delay following the last pulse, at contacts 929 opens the circuit to transfer relay 930, and at contacts 928 closes a circuit via contacts 933, 953, 942, 939 to the upper winding of sequence relay 940 which operates only partly, and closes its preliminary make contacts 944. Relay 926 also at contacts 927 closes a circuit via contacts 931, 952, 941, 937, and wire 772 to the storage-connect relay 730, which operates fully, and at contacts 739 closes a circuit to the storage switch vertical magnet 790. This circuit is from ground through contacts 921, 932, 962, wire 1019, contacts 1092, wire 1098 in cable 740, contacts 739, wire 9 in cable 750, and magnet 790 to battery. Magnet 790 thereupon operates and closes the cross-bar contacts 19, 99, 09, and at contacts 791 locks over wire 776 to ground at contacts 921. Transfer relay 930 then restores after its delay period has elapsed, and at contacts 931 and 932 releases relays 730 and 1090. Relay 930 also at contacts 933 opens the original circuit to sequence relay 940, which thereupon operates fully and locks with both windings energized in series, from ground through contacts 921, 956 and 944. Relay 940 thereupon, at contacts 941 disconnects the storage-connect relays, at contacts 943 prepares a circuit to sequence relay 950, at contacts 946 opens another point in the dial tone circuit, and at contacts 945 unlocks and releases sequence relay 935.

The third digit "0" now causes pulsing relay 910 to release and reoperate ten times. Transfer relays 926 and 930 again operate on the first pulse and the counting relays count off ten steps, which leaves relay 1000 locked operated after the last pulse, and all of the other counting relays normal.

Transfer relay 926 now restores, after the usual delay period, closes contacts 927 without effect, at contacts 929 opens the circuit to relay 930, and at contacts 928 closes a circuit to sequence relay 950, through contacts 933, 953, 943. Relay 950 operates fully in this circuit, and at preliminary make contacts 954 locks direct to ground at release relay contacts 921. Relay 950 also, at contacts 952 opens another point in the circuit to the storage-connect relays, at contacts 953 opens the sequence relay operate circuit, and at contacts 955 shunts contacts 932 to hold the last operated counting relay 1000, following the release of transfer relay 930. Sequence relay 950 further, at contacts 956 unlocks and releases sequence relay 940, at contacts 957 opens another point in the dial tone circuit, at contacts 958 opens the pulsing circuit, and at contacts 951 closes a circuit to the common control relay 810 individual to this register. This circuit is over wire 841, through the normally closed contacts of the make-before-break springs 813, and the upper winding of relay 810 to resistance battery through contacts 807 of common control relay 805.

Common control relay 810 operates quickly in this circuit, and at make contacts 813 connects its lower winding to the ground on wire 841, thereby locking itself operated independently of its upper winding. Relay 810 also, at contacts 814 operates trigger relay 970, at contacts 812 disconnects the succeeding common control relays, and at contacts 811 operates the power control common control relay 805. Relay 805 thereupon, at contacts 806 disconnects vertical magnet start ground from the primary cross-bar switches, at contacts 807 disconnects battery from the other common control relays, at contacts 808 disconnects battery from all relays 915 and hence from all call initiating horizontal magnet start circuits, and at contacts 809 disconnects battery from the hundreds relays. If a call is initiated while relay 805 is thus operated, the corresponding line relay will operate, but no further action will take place until relay 805 releases. Since relay 805 remains operated for only a small fraction of a second however, there will be no detectable switching delay in the great majority of such cases.

Trigger relay 970 upon operating, at contacts 973 to 978 prepares a number of operating circuits, and at contacts 972 closes a circuit to "busy" relay 985, which however, being made slow to operate, is not actuated immediately. Relay 970 further, at contacts 971 extends ground to tens relay 130, by way of wire 773, storage-switch cross-bar contacts 19, and wire 185 in the cables 990 and 900.

Tens relay 130 operating quickly in this circuit, at contacts 134 connects direct ground to the horizontal magnet start wire 373, and at contacts 138, assuming the called line to be free, operates the cutoff relay 125 thereof in series with the register idle test relay 980, from ground through relay 980, contacts 976, wire 1049, contacts 1007, wire 190C in cables 995 and 900, contacts 138 and relay 125 to battery. Cutoff relay 125 upon operating disconnects line relay 120, while idle test relay 980 closes contacts 982 without effect, at contacts 981 disconnects busy relay 985 before it can operate, and at contacts 983 prepares the primary switch vertical magnet operating circuit.

Meanwhile, the horizontal start ground from tens relay contacts 134 on start wire 373 finds a path through the primary and secondary switches to battery through the local-call switching relays 550 and 520 in the held connector. This circuit is through contacts 311A, right winding of primary switch horizontal magnet 320A, wire 474 in cable 441, contacts 422, 411A, 421A, 491A, right winding of secondary switch horizontal magnet 400A, wire 574 in cable 575, upper winding of relay 550, register-finder cross-bar contacts 6181, wire 908, contacts 964, 986, 974, wire 907, finder cross-bar contacts 6171, and the upper winding of relay 520 to battery.

The horizontal magnets and relays 520 and 550 operate quickly in this circuit, and horizontal magnet 320A at contacts 322A operates the primary switch vertical magnet 300 over the following circuit: ground, contacts 322A, wire 372, contacts 133, wire 189 in cable 900, contacts 983, 978, wire 1029, contacts 1006, wire 190V in cables 995 and 900, contacts 139, wire 374, and the right winding of magnet 300 to battery. At the same time, both horizontal magnets in conjunction operate the secondary switch vertical magnet 420 over the following circuit: ground, contacts 402A, wire 436 in cable 441, contacts 324A, wire 475 in cable 441, and the winding of magnet 420 to battery. Vertical magnet 300 thereupon closes cross-bar contacts 3032, 3042, 3052, while vertical magnet 420 closes cross-bar contacts 4230, 4240, 4250. Magnet 420 also, at break contacts 422 releases the horizontal magnets 320A and 400A.

Meanwhile, in the connector, local switching relay 520, at make contacts 521, 523 has extended the calling line 191 to battery-feed relay 530, which operates quickly, and at contacts 531 locks up relay 520 and places a new holding ground on test wire 503. Relay 520 also, at contacts 525 opens another point in the horizontal start circuit through this connector, and at break contacts 521, 523 disconnects register relay 910 from the calling line, to start the release of the register. Local switching relay 550 at the same time, at contacts 551, 554 closes the ringing circuit, at contacts 555 closes the ring-back circuit, at contacts 552 locks to ground at contacts 531, and at contacts 553 extends this same ground to the called line to hold that end of the connection. This ground passes over test wire 573 in cable 575, through the secondary switch cross-bar contacts 4240 and locking contacts 421 to battery through vertical magnet 420, and from there over test wire 473 in cables 442 and 441, through the primary switch cross-bar contacts 3042 and locking contacts 301 to battery through vertical magnet 300, and thence over test wire 109 to battery through line cutoff relay 125. This ground also shunts idle test relay 980 which starts to release.

In the register, pulsing relay 910 releases quickly following the operation of the connector local switching relay 520, and opens the circuit of release relay 920 which also restores, after a short delay. Relay 920 thereupon, at contacts 924 unlocks and releases vertical magnet 610 in the register finder, and at contacts 921 unlocks and releases the sequence and counting relays 950 and 1000, and the vertical and horizontal magnets 790 and 710A of the storage switch. The counting relay disconnects test relay 980 to complete the release of the latter, and the storage switch, at cross-bar contacts 19 releases the operated tens relay 130, while sequence relay 950, at contacts 951 unlocks and releases the associated common control relay 810. Relay 810 in turn, at contacts 811 releases common control relay 805, and at contacts 814 releases trigger relay 970. The register is now normal and available for use in another call, and the release of common control relay 805 re-enables the call initiating circuits.

Ringing current from the connector is now impressed on the called line over the following circuit: grounded generator on ringing wire GEN, contacts 548 and 554, wire 572 in cable 575, cross-bar contacts 4250, wire 472 in cables 442 and 441 cross-bar contacts 3052, line wire 108, called station 190, line wire 107, cross-bar contact 3032, wire 471 in cables 441 and 442, cross-bar contacts 4230, wire 571 in cable 575, and contacts 551 and 546 to battery through the upper winding of ring-cut-off relay 545. Ring-back tone is at the same time returned over the calling line from tone wire RBT, through condenser 534, contacts 549 and 555, and condenser 533.

The bell at the called station now rings in the usual way, and when the called party answers, ring-cut-off relay 545 operates over the ringing circuit from the superimposed direct current, and at contacts 547 locks to ground at contacts 531. Relay 545 also, at contacts 549 disconnects the ring-back tone, at break contacts 546 and 548 disconnects the ringing current, and at make contacts 546 and 548 connects the called line to back-bridge relay 540, which immediately operates and at contacts 541 places another ground on test wires 503 and 573. A talking circuit is thus completed between the calling and called lines 191 and 190 which includes line wires 101 and 102 of line 191, cross-bar contacts 3131, 3151, wires 431, 432, cross-bar contacts 4131, 4151, wires 501, 502, contacts 511, 514, 521, 523, condensers 532, 533, contacts 546, 548, 551, 554, wires 571, 572, cross-bar contacts 4230, 4250, wires 471, 472, cross-bar contacts 3032, 3052, and line wires 107 and 108 of line 190. Front-bridge relay 530 feeds talking battery to the calling line, and back-bridge relay 540 feeds talking battery to the called line.

When the conversation has been completed and both parties have hung up, the release of both front and back-bridge relays 530 and 540 removes ground from the test wires 503 and 573, releasing the operated line cutoff relays 115 and 125, as well as the operated vertical magnets 310, 300, 410 and 420. Connector relays 520, 545 and 550 unlock and release at the same time, thus restoring the connector also to normal.

If the called line 190 had been busy instead of idle, its cutoff relay 125 would have been already operated, so that when tens relay 130 was operated to connect relay 125 in series with idle relay 980 in the register, contacts 138 would have extended a shunting ground from wire 109 back over wire 190C in cables 900 and 995, and through contacts 1007, wire 1049 and contacts 976 to relay 980. Relay 980 would accordingly fail to operate, and thus would not forward the vertical start ground for operating the primary switch vertical magnet. Busy relay 985 does operate however, after a short delay, and at contacts 986 and 987 disconnects wire 907 from wire 908, and connects direct ground to wire 907 alone, and to connector relay 520 alone, by way of contacts 974 and 6171. Relay 520 upon operating in this circuit, operates relay 530 from the calling loop, locks to contacts 531 of relay 530, and causes the release of the register and register finder and the associated equipment, as before. Since connector relay 550 has not operated, the connection is not extended to the called line. Busy tone is however connected to the calling line from the busy tone lead BT, through contacts 524, condenser 535, and contacts 556. The calling party thereupon hangs up, and causes the release of front bridge relay 530, which releases the connection.

*Outgoing call*

Let it now be assumed that line 191 wishes to call a subscriber in the neighboring manual exchange, rather than a subscriber in his own exchange, and that the two-digit call number "00" has been assigned to the group of trunks leading to the said manual exchange, the first two of which are shown in Fig. 2.

The operations of seizing a register are the same as for a local call, and it will be assumed that the connector of Fig. 5 and the register of Figs. 7, 9 and 10 are again the units seized, over the same circuits already described. To summarize this operation briefly, line relay 110 operates upon the initiation of the call, and operates hundreds relay 140. Relay 140 in turn closes a series circuit through horizontal magnets such as 310A, 410A, 610A and register relay 915, which operate. Horizontal magnet 310A operates vertical magnet 310 corresponding to the calling line, horizontal magnet 410A operates vertical magnet 410 corresponding to the operated horizontal magnet 310A, and horizontal magnet 610A operates vertical magnet 610 corresponding to the operated horizontal magnet 410A. In the connector, relay 526 operates momentarily, and in the register, relays 915, 910 and 920 operate and return ground over wires 905 and 909. Vertical magnet 610 of the register-finder closes the cross-bar contacts 6131–6191, and locks to register ground on wire 909, vertical magnet 410 of the secondary switch closes the cross-bar contacts 4131–4151 and locks to register ground over test wires 905, 503 and 433, and vertical magnet 310 of the primary switch closes the cross-bar contacts 3131–3151, and locks to register ground over test wires 905, 503, 433 and 103. Line cut-off relay 115 also operates from the ground on test wire 103, and releases line relay 110, which releases the hundreds relay 140. The horizontal magnets also release, following the operation of vertical magnet 410 and register relay 920, which open the original series circuit after the vertical magnets have locked energized. Register relay 915 also releases, after a brief delay.

The calling line is now extended through cross-bar contacts 3131 and 3151, 4131 and 4151, and 6131 and 6141 to the register pulsing relay 910, which is now held over the subscriber's loop, while dial tone through condenser 919 in the register is returned over the same loop.

The calling party, upon hearing the dial tone, proceeds to dial the digits "00" assigned to the manual exchange. In response to the first digit "0," pulsing relay 910 releases and reoperates ten times, and passes ten impulses to the counting relays of Fig. 10, via contacts 912, 925, 958, and wire 1009. The counting relays count off ten steps in the same manner as already described for a local call, leaving relay 1000 operated following the tenth and last pulse, and all of the other counting relays normal. Transfer relays 926 and 930 also operate as before on the first pulse, and release slowly in succession after the last pulse.

Upon the release of transfer relay 926, break contacts 927 thereof operate storage connect relay 720 via contacts 931, 952, 941 and 936, as before, while break contacts 928 again operate the two-step sequence relay 935 in its first step, to close contacts 939A. Connect relay 720 upon operating, completes a circuit to the storage switch horizontal magnet 700A, from ground through contacts 921, 932, 962, wire 1019, contacts 1002, wire 1008 in cable 740, contacts 720A, wire J in cable 760, and the winding of horizontal magnet 700A to battery. Magnet 700A thereupon operates to raise its selecting fingers, and at make contacts 701A locks over wire 776 to ground at contacts 921. Transfer relay 930 then releases, at contacts 931 releases connect relay 720, at contacts 932 unlocks and releases counting relay 1000, and at contacts 933 opens the original operate circuit to sequence relay 935, which then operates in its second step with both windings energized in series, from the ground at contacts 921 which had previously shunted the lower winding of 935.

In response to the second digit "0," pulsing relay 910 again passes ten impulses to the counting relays and to transfer relay 926. Relays 926 and 930 operate as usual on the first pulse and release after the last pulse, and the counting relays again count off ten steps, leaving relay 1000 locked operated as before, to ground from contacts 921 through contacts 932, 962, wire 1019, and contacts 1003.

Upon the release of transfer relay 926 following the last pulse, contacts 927 thereof operate storage connect relay 730, via contacts 931, 952, 941 and 937, while contacts 928 operate sequence relay 940 in its first step, via contacts 933, 953, 942, 939. Relay 940 accordingly closes its contacts 944 to prepare the circuit through its lower winding, now shunted by ground from contacts 921. Connect relay 730 at the same time closes a circuit to the storage switch vertical magnet 700, from ground through contacts 921, 932, 962, wire 1019, contacts 1002, wire 1008 in cable 740, contacts 730A, wire 0 in cable 750, and the winding of magnet 700 to battery.

Vertical magnet 700 operates, closes the cross-bar contacts 00–1, 00–2, 00–3, 90, 10, and at its separate contacts 701 locks over wire 776 to release-relay ground at contacts 921. Magnet 700 also extends this same ground through cross-bar contacts 00–3 and wire 775 to outward relay 960. Relay 960 operates quickly in this circuit, at contacts 962 releases the counting and storage connect relays 1000 and 730, at contacts 963 prepares a circuit to the connector outward switching relay 510, at contacts 964 splits the local switching wires 907, 908, and at contacts 961 operates sequence relay 950, from ground through contacts 921 and 932. Relay 950 upon operating, at contacts 954 locks direct to the ground at contacts 921, and at contacts 951 operates common control relay 810 corresponding to this register. Relay 810 in turn operates relay 805, which disables the call-initiating circuits momentarily, in the manner previously described. Relay 810 at the same time at contacts 814 operates trigger relay 970. Relay 970 in turn, closes contacts 975–978 to no purpose, at contacts 973, 974 prepares switch-through and busy circuits, at contacts 972 closes the circuit of the slow to operate busy relay 985, and at its contacts 971 completes a circuit to the trunk group tens relay 280 in Fig. 2. This circuit is from ground at contacts 971, wire 773, cross-bar contacts 00–1, wire 285 in cables 990, 900, and the winding of relay 280 to battery. The release of transfer relay 930 in the register, which occurs during or after the foregoing operations, depending on its delay period, has no other effect than to release sequence relay 940, which now has no circuit for its lower winding due to the open contacts 956.

Trunk group relay 280 upon operating, at contacts 282 prepares a circuit for idle test relay 930 in the register, and at contacts 281 extends a seizure ground to the associated group of repeaters, with the object of seizing the first idle repeater of the group. Assuming the first repeater to be idle at this time, outward call relay 260 thereof will operate from this ground, to resistance battery through contacts 253 and 217. Relay 260 thereupon, at chain contacts 264 disconnects the succeeding outward call relays in the other repeaters of the group, and at contacts 263 operates switching relay 220, which grounds test wire 203, disconnects relays 210 and 215, and at make contacts 222 and 224 closes a signal loop to the manual exchange via contacts 251, the impedance coil 230 and the trunk wires 226 and 227. Relay 260 also, at contacts 265 closes a horizontal start circuit to a primary switch such as 350 associated with this trunk group, at contacts 262 prepares a circuit to a vertical magnet therein corresponding to this particular trunk circuit, and at contacts 261 completes a circuit to the register idle test relay 980.

The circuit for idle test relay 980 is from battery through resistance 254, contacts 261, 282, wire 289 in cables 900 and 990, storage switch cross-bar contacts 00–2, wire 774, and the winding of relay 980 to ground. Relay 980 upon operating in this circuit, at contacts 981 disconnects busy relay 985, and at contacts 982 completes a circuit to the connector outward switching relay 510. Contacts 983 are now without effect.

The horizontal start ground, at the same time is extended through the appropriate primary and secondary switches and the connector to the held register over a circuit which may be traced as follows: ground through contacts 265, wire 273, which corresponds to wire 373 in Figs. 1 and 3, cable 351, right winding of a horizontal magnet in primary switch 350, cable 451, wire 484, contacts 402, 411A, 421A, right winding of the secondary switch horizontal magnet 490A, wire 564 in cable 565, upper winding of connector relay 510, register finder cross-bar contacts 6161, wire 906, and contacts 963, 973 and 982 to resistance battery. The two horizontal magnets and relay 510 operate in series in this circuit.

The operated horizontal magnet (not shown) in primary switch 350 closes contacts corresponding to 312A, which connect ground to wire 272 in cable 351. This ground is accordingly extended by repeater contacts 262 to wire 276 and back over cable 351 to the right hand winding of a vertical magnet not shown, in primary switch 350, but which corresponds to vertical magnet 310. The operated horizontal magnet 490A at the same time, at contacts 492A closes a circuit to the secondary switch vertical magnet 400 as follows: ground through contacts 492A, a branch of wire 436 in cable 451, contacts corresponding to 314A on the operated horizontal magnet in primary switch 350, back over wire 485 in cable 451, and through magnet 400 to battery. The operated outward switching relay 510, at make contacts 512 and 513 prepares locking circuits, at make contacts 511 and 514 prepares the extension of the calling line to the outgoing trunk, and at break contacts 511 and 514 opens the circuit to pulsing relay 910, to start the release of the register.

The affected vertical magnets operate quickly, over the circuits indicated. The primary switch vertical magnet thereupon closes cross-bar contacts corresponding to 3131, 3141, 3151, and at contacts corresponding to 311 locks to ground from make contacts 223 over test wire 203 in cable 351, which corresponds to test wire 103 in Figs. 1 and 3. The secondary switch vertical magnet 400 at the same time closes the cross-bar contacts 4039, 4049, 4059, and at contacts 401 locks to the same ground on test wire 203 which is now extended through the cross-bar contacts corresponding to 3141 in primary switch 350, and thence to test wire 483 in cables 451 and 452 to contacts 401. This same ground is also further extended through the secondary switch cross-bar contacts 4049, and wire 563 in cable 565 to contacts 513 and the lower locking winding of relay 510. Relay 510 in turn, at contacts 512 passes this same ground back over test wires 503, 433 and 103. This holds the connection to the calling line, and after the release of the register, the vertical magnets 410 and 310, and line cutoff relay 115 will remain operated in this circuit, through cross-bar contacts 4141 and 3141.

The calling line loop is now extended to battery feed relay 240 in the repeater over the following circuit: the calling telephone 191, line wires 101, 102, primary cross-bar contacts 3131, 3151, wires 431, 432, secondary cross-bar contacts 4131, 4151, wires 501, 502, make contacts 511, 514 in the connector, wires 561, 562 in cable 565, secondary cross-bar contacts 4039, 4059, wires 481, 482 in cables 452 and 451, the cross-bar contacts corresponding to 3131, 3151 in primary cross-bar switch 350, repeater wires 201, 202 in cable 351, make contacts 221, 225, and the windings of relay 240 to battery and ground. Relay 240 operates in this circuit, at contacts 241 shunts contacts 251 to maintain the signal loop to the manual exchange, and at contacts 242 operates release relay 250. Relay 250 in turn, opens contacts 251 without effect, at contacts 252 connects a new ground to switching relay 220, and at contacts 253 opens the circuit to outward relay 260, which releases after a short delay, and re-establishes the seizure chain to the other repeaters.

The register pulsing relay 910 releases quickly, following the operation of the connector switching relay 510. Release relay 920 then also releases after the usual delay, and at contacts 924 unlocks and releases vertical magnet 610 in the register finder, and at contacts 921 releases sequence relay 950, outward relay 960, and the storage switch magnets 700 and 700A. Sequence relay 950 releases the common control relays 810 and 805, and the storage switch opens its cross-bar contacts, whereupon contacts 00–1 release trunk group relay 280, contacts 00–2 release idle-test relay 980, and contacts 00–3 further open the circuit to the outward relay 960. The release of common control relay 810 also releases trigger relay 970. The register is now again normal, and may be seized again by the register-finder for a new call.

The closure of the signal loop to the manual exchange by the repeater lights a signal lamp in front of an operator at the distant exchange in known manner. When the operator answers, a talking connection is established with the calling line over the trunk wires 226 and 227, make contacts 222, 241 and 224, condensers 231 and 232, make contacts 221 and 225 to wires 201 and 202, and thus back through the cross-bar switches and the connector over the circuit previously traced to line 191. The operator the talks with the calling party over this circuit, and completes the connection as requested.

The local end of the connection is held until the calling party hangs up. When this occurs, the circuit to battery feed relay 240 in the repeater is opened, and this relay releases immediately, followed shortly thereafter by release relay 250. Release relay 250 then releases switching relay 220, which removes its ground from test wire 203, and thereby releases the local end of the connection. The release of relay 220 also signals the operator who releases the trunk.

During the time that the first repeater is held, any further trunk calls would be passed to the next idle repeater, such as that shown in the lower part of Fig. 2. As long as a repeater is busy, it cannot be seized by a local subscriber, due to the fact that its contacts 253, or 217 in the case of an incoming call, will be open, so that its outward relay 260 cannot be operated. If all of the repeaters of the group are busy, no relay 260 can be operated if a local subscriber attempts a call to the manual exchange at that time. Accordingly, no contacts 261 will close, and there will be no circuit over wire 289 and the storage switch contacts 00–2 to idle test relay 980. Also, no contacts 265 will close, to operate the appropriate cross-bar horizontal magnets and the connector outward switching relay 510. In the register, due to the non-operation of test relay 980, busy relay 985 operates, after a short delay, and at contacts 987 extends ground over wire 907 and contacts 6171 of the register finder to the connector local switching relay 520, which operates. This extends the calling line to front bridge relay 530 which operates quickly, and grounds test wire 503 to hold the connection to the calling line, and to lock relay 520. The operation of relay 520 also disconnects register relay 910 to cause the release of the register. Relay 520 in addition passes busy tone to the calling line, by way of contacts 524, condenser 535, contacts 556, and condenser 533. The calling party then hangs up.

Since the repeaters are self selecting, there are no specific limitations on the number of repeaters or trunks in a particular group having a common call number. It is also a simple matter to provide additional trunk groups if required. This merely requires furnishing the additional repeater groups, each provided with its tens relay corresponding to relay 280, and by making the necessary connections to the primary switches, and to the appropriate contacts of the storage switch. To connect up the storage switch to serve an additional trunk group having the call number 09 for example, the contact 09–1 would be connected to another tens relay similar to 280, the contact 09–2 would be connected to contacts corresponding to contacts 282, on this second tens relay, and contact 09–3 would be multipled to contact 00–3. Additional groups 08, 07 and so on, could be added in like manner. If however, it was desired to use the digits 09 as part of a local number, then it would only be necessary to connect contact 09–1 to the proper tens relay, and to leave the contacts 09–2 and 09–3 un-connected.

*Incoming call*

Assuming that an operator at the manual exchange seizes the trunk 226, 227 to extend a call to a local party, such as the party 191 for example, the seizure of the trunk will close a loop to line relay 210 in the repeater. Relay 210 accordingly operates, from ground through contacts 216 and 224, the manual loop, and contacts 222 to battery through relay 210. Relay 210 thereupon at contacts 212 and 213 prepares the horizontal and vertical start circuits, at contacts 214 opens the vertical start circuit to the other repeaters, and at contacts 211 closes a circuit to the tenth hundreds relay 150 which operates. The circuit for relay 150 is from ground through contacts 211, wire 218, through contacts such as 146 and 141 on all of the hundreds relays except relay 150, winding of relay 150, and wire 803 in the cables 900 and 990 to resistance battery at contacts 809 of the common control relays.

Hundreds relay 150 operates quickly in this circuit, and disconnects the other hundreds relays momentarily, and at contacts 153 connects ground to the horizontal start wire 219. This ground then passes through the closed contacts 212 to the start wire 273 leading to the primary cross-bar switch 350, by way of cable 351. From wire 273, this ground will be assumed to find a path to an idle connector and register, such as those illustrated for example. This path would then extend through the proper horizontal magnet in primary switch 350 to wire 484 in cable 451, contacts 402 of vertical magnet 400, horizontal magnet 410A, wire 504, contacts 515, 525 and 612, horizontal magnet 610A, wire 901, and register relay 915 to common control battery.

The horizontal magnets operate in this circuit, along with register relay 915, which causes relays 910 and 920 to operate as before. The horizontal magnets then operate the vertical magnets to extend the calling line to the register. For the primary switch vertical magnet, the circuit is from ground through contacts 806 of the common control circuit, wire 802 in cables 990 and 900 to primary switch 350, contacts similar to contacts 313A on the operated horizontal magnet therein, wire 271 in cable 351, repeater contacts 213, wire 277 in cable 351 back to the primary switch, and thence to battery through the left winding of the vertical magnet associated with this repeater. In the secondary switch, vertical magnet 400 operates in the following circuit: ground through contacts 412A, a branch of wire 436 in the cable 451 to primary switch 350, contacts similar to 314A on the operated horizontal magnet therein, and wire 485 in cable 451 to magnet 400. In the register finder, vertical magnet 610 operates from ground through contacts 612A, relay 526, wire 500, contacts 413A and wire 505. The primary switch 350 accordingly closes contacts similar to 3131, 3141, 3151, the secondary switch closes contacts 4031, 4041, 4051, and the register finder closes contacts 6131 to 6191. The register finder magnet 610 now locks over contacts 611 and 6191 to ground at register contacts 924, while the secondary switch magnet 400 locks over contacts 401, 4041, and 6151 to ground at register contacts 923. This same ground is also extended over test wire 483 and cables 452 and 451 to primary switch 350 to lock the operated vertical magnet therein, from where it passes over test wire 203 in cable 351 to the repeater, and through break contacts 223 therein to cut-off relay 215 and battery.

Cutoff relay 215 accordingly operates, and at contacts 217 disconnects battery from seizure relay 260 to mark this repeater busy. Relay 215 also, at contacts 216 opens the circuit to line relay 210 which releases after a short delay, and at contacts 211 releases hundreds relay 150. Relay 210 also, at contacts 212 and 213 opens the horizontal and vertical start circuits to the primary switch 350, and at contacts 214 re-establishes the vertical ground chain to the other repeaters. The various horizontal magnets and register relay 915 release in the usual way, following the operation of the vertical magnets, and the trunk loop is now extended to register relay 910 as follows: wires 226, 227, break contacts 222, 224, 221, 225, wires 201, 202 in cable 351, contacts in primary switch 350 corresponding to contacts 3131, 3151, wires 481, 482 in cables 451 and 452, contacts 4031, 4051, wires 501, 502, break contacts 511, 514, 521, 523, contacts 6131, 6141 and wires 903 and 904 to relay 910. Relay 910 is thus held over this loop independently of relay 915. The register then returns dial tone, through condenser 919, and the operator dials the number of the wanted line 191.

In response to the first digit "1" for example, relay 910 passes one impulse to the counting relays over wire 1009, to operate and lock counting relay 1010. Transfer relays 926 and 930 also operate from this impulse and release in succession thereafter, in the usual way. Upon the release of 926, connect relay 720 operates, sequence relay 935 operates in its first step, and horizontal magnet 710A operates as before over contacts 921, 932, 962, 1012, and 721, and locks to wire 776 and contacts 921. Upon the release of 930, relays 720 and 1010 release, and sequence relay 935 operates in its second step, and likewise locks to contacts 921.

In response to the second digit "9," relay 910 passes nine impulses over wire 1009, operating the counting relays in succession as described for a local call, and leaving relay 1090 operated and locked to wire 1019, with transfer relays 926 and 930 operating as usual on the first pulse and releasing in succession after the last pulse. Upon the release of 926, connect relay 730 operates, sequence relay 940 operates in its first step, and vertical magnet 790 operates over contacts 921, 932, 962, 1092 and 739, and locks to wire 776 and contacts 921. Upon the release of 930, relays 730 and 1090 release, and sequence relay 940 operates in its second step, locks in turn to contacts 921, and releases sequence relay 935.

In response to the third digit "1," relay 910 passes one impulse over wire 1009 to reoperate and lock counting relay 1010, and to reoperate transfer relays 926 and 930. Upon the release of transfer relay 926, sequence relay 950 operates and locks, releases sequence relay 940, closes a new locking circuit for counting relay 1010, and operates common control relays 810 and 805. Trigger relay 970 then operates from relay 810, and at contacts 971 operates tens relay 130 over cross-bar contacts 19 and wire 185 in cables 990 and 900.

Upon the operation of tens relay 130, assuming the called line to be free, idle test relay 980 and line cutoff relay 115 operate in series over the following circuit: ground through relay 980, contacts 975, wire 1059, contacts 1017, wire 191C in the cables 995 and 900, and contacts 131 to battery through relay 115. Relay 130 also at contacts 134 grounds the horizontal start wire 373 which ground then finds a path to the held connector through contacts 311A, horizontal magnet 320A, wire 474 in cable 441, contacts 422, 411A, 421A, 491A, horizontal magnet 400A, wire 574 in cable 575, upper winding of local switching relay 550, contacts 6181, wire 908, contacts 964, 986, 974, wire 907, contacts 6171, and the upper winding of local switching relay 520 to battery.

The horizontal magnets, and the relays 520 and 550 operate in this circuit, and the horizontal magnets operate the appropriate vertical magnets. Magnet 320A for example, operates vertical magnet 310, from ground through contacts 322A, wire 372, contacts 133, wire 189 in cable 900, contacts 983, 977, wire 1039, contacts 1016, wire 191V in cables 995 and 900, contacts 132, wire 376, and the right winding of magnet 310 to battery. Horizontal magnet 400A at the same time operates vertical magnet 420 from ground through contacts 402A, wire 436 in cable 441, contacts 324A and wire 475 in cable 441 to magnet 420. Magnet 310 thereupon closes its locking contacts 311, and cross-bar contacts 3132, 3142, 3152, while magnet 420 closes its locking contacts 421, and cross-bar contacts 4230, 4240, 4250. Relay 520 upon operating disconnects the calling trunk loop from register relay 910 and connects it instead to the connector front bridge relay 530. Relay 910 restores to start the release of the register, and relay 530 operates and connects a new ground to test wires 503, 483, and 203 to hold the calling end of the connection and to lock relay 520, after the release of the register. Relay 550, at the same time, extends the same ground from contacts 531 through contacts 552 and 553 to test wires 573, 473 and 103 to hold the called end of the connection.

Local switching relay 550 at the same time connects ringing current to the called line as follows: grounded generator through contacts 548 and 554, wire 572, contacts 4250, wire 472, contacts 3152, wire 102, telephone 191, wire 101, contacts 3132, wire 471, contacts 4230, wire 571, and contacts 551 and 546 to battery through ring-cut-off relay 545. The called bell rings in the usual way, while ring-back tone is returned to the operator via condenser 534, contacts 549 and 555 and condenser 533.

When the called line answers, ring-cut-off relay 545 operates over the ringing circuit from the superimposed direct current, and lock. Back-bridge relay 540 now operates over the called line loop, and provides an additional holding ground for both ends of the connection. A talking connection is now completed between the calling and called ends as follows: trunk wires 226, 227, break contacts 222, 224, 221, 225, wires 201, 202, cable 351, cross-bar contacts in primary switch 350, cables 451, 452, wires 481, 482, contacts 4031, 4051, wires 501, 502, break contacts 511, 514, make contacts 521, 523, condensers 532, 533, make contacts 546, 548, 551, 554, wires 571, 572, cable 575, contacts 4230, 4250, wires 471, 472, cables 442, 441, contacts 3132, 3152, and wires 101, 102. Talking battery is fed to the respective ends of the connection by the front and back-bridge relays 530 and 550. The register and common control relays release in the same manner as already described, following the operation of connector relay 520. The connection is released only when both parties have released, as before.

It may be noted that in the detail circuits the inlet circuit of the illustrated connector and also the local and trunk outlet circuits thereof, are connected to the secondary cross-bar switch illustrated in Fig. 4. This was done as a matter of convenience in describing the operation, and to simplify the drawings. As previously indicated, the possible connections are many, and the preferred method may depend on various factors, which need not be considered here.

It should also be noted that other changes may be made in the connections and arrangement of the system without departing from the spirit and scope of the invention, such as applying it to small or large systems. For a system of less than 100 lines for example, the secondary switches would be omitted and the connectors made directly accessible to the primary switches, and for a system of more than 1000 lines, an additional rank of cross-bar switches would be employed.

What is claimed is:

1. Switching equipment for use in an automatic telephone system comprising a first cross-bar switch and a group of line circuits connected thereto, a speech circuit for each line circuit, a plurality of connector circuits accessible to said switch, a register finder cross-bar switch connected to said connectors, a plurality of registers accessible to said finder, means responsive to the seizure of one of said line circuits for extending the speech circuit thereof automatically from said one line circuit through said first switch to an idle one of said connectors and through said one connector and said cross-bar finder to an idle one of said registers, means in said register for storing impulses corresponding to the digits of the call number of a second one of said line circuits received over said extended speech circuit, means in said register operated responsive to the completion of the receipt of said digits thereby for causing said first switch to extend the speech circuit of said second line circuit therethrough to said one connector, and means in said one connector controlled over said last speech circuit for connecting the speech circuits of said two line circuits together through said first switch and said one connector, and for releasing said finder and said register from said connection.

2. Switching equipment for use in an automatic telephone system comprising a plurality of primary cross-bar switches, a plurality of line circuits connected to said primary switches, a plurality of secondary cross-bar switches accessible to said primary switches, a plurality of connecting circuits accessible to said secondary switches, outlet magnets and contact magnets in said switches, a start circuit for each of said primary switches having branch paths through the outlet magnets of said switches, means operated responsive to the seizure of one of said line circuits for closing the start circuit of the associated primary switch over a free one of said branch paths through an outlet magnet in said primary switch and an outlet magnet in one of said secondary switches to an idle one of said connecting circuits, and said last named magnets operating in series in said one branch path, contacts closed by said one line circuit and said operated outlet magnets for operating a contact magnet in said primary switch corresponding to said seized line circuit and a contact magnet in said secondary switch corresponding to said operated outlet magnet in said primary switch, a speech circuit, and contacts closed by said operated contact magnets for extending said speech circuit from said one line circuit through said primary and secondary switch to said one connecting circuit.

3. Switching equipment as in claim 2 including a register, means controlled by said start circuit for further extending said speech circuit through said one connecting circuit to said register, means in said register for storing impulses received over said extended speech circuit and corresponding to the digits of the call number of a second one of said line circuits, means in said register responsive to the completion of the receipt of said call number for causing said impulse storing means to close the start circuit of the primary switch associated with said second line circuit over a free branch path of said last start circuit through an outlet magnet in said last primary switch and an outlet magnet in one of said secondary switches to said one connecting circuit, and said last named magnets operating in series in said last branch path, contacts closed by said register storing means and said last operated outlet magnets for operating a contact magnet in said last primary switch corresponding to said second line circuit and a contact magnet in said last secondary switch corresponding to said last operated outlet magnet in said last primary switch, a second speech circuit, and contacts closed by said last operated contact magnets for extending said second speech circuit from said second line circuit through said last primary and secondary switches to said one connecting circuit.

4. Switching equipment as in claim 1 including a line relay in each said line circuit operative responsive to the seizure of such line circuit, a series start circuit energized in response to the operation of any one of said line relays, a plurality of possible paths through said switches for said start circuit, means for causing said start circuit to extend itself automatically over only one of said paths to said register via said one connector and said switches, said switches operated responsive to the completion of said start circuit to an idle register for extending said connection from such seized line circuit to such idle register to seize said register through said switches, a chain circuit controlled by said line relays to enable only one of said line relays at a time to energize said start circuit, and means responsive to said extension of said connection to said register for releasing said operated line relay, to re-enable the other line relays to energize said start circuit.

5. Switching equipment as in claim 4, including a common control relay associated with said registers, means in said seized register responsive to completion of the receipt of said call number thereby for energizing said start circuit, means for causing said start circuit to extend itself automatically through said switches to said one connector and said seized register, said first switch re-operated responsive to the completion of said last start circuit for connecting said second line circuit to said one connector, means in said register for operating said common control relay responsive to said completion of the receipt of said call number, means responsive to said operation of said control relay for disabling the other registers and all of said line circuits from energizing said start circuit, and means responsive to the release of said register for releasing said control relay to re-enable said line circuits and said other registers to energize said start circuit.

6. Switching equipment for use in an automatic telephone system comprising line circuits, primary and secondary cross-bar switches, connecting circuits, a register finder and registers, outlet selecting and inlet selecting magnets for said switches, a speech circuit for each said line circuit, a start circuit for each said primary switch, means operated responsive to the seizure of one of said line circuits for closing said start circuit through an outlet magnet in one of said primary switches and an outlet magnet in one of said secondary switches, through one of said connecting circuits, and through said finder to one of said registers, said outlet magnets being operated in series in this circuit, means controlled by said seized line circuit and said operated outlet magnets for operating an inlet selecting magnet in said one primary switch and in said one secondary switch, and contacts closed by said operated inlet selecting magnets for extending said speech circuit from said one line circuit through said primary and secondary switch and said connecting circuit and finder to said one register.

7. Switching equipment as in claim 6 including chain circuits controlled by said line circuits for enabling only one line circuit at a time to energize a start circuit, and a chain circuit in each said switch controlled by said outlet selecting magnets therein for enabling said start circuit to operate only one outlet selecting magnet in such switch at a time.

8. Switching equipment as in claim 6 including a line relay for each line circuit operated responsive to seizure of said line circuit, a hundreds relay for each hundred line circuits, means responsive to the operation of any one of said line relays for operating the corresponding hundreds relay, means responsive to the operation of said hundreds relay and said line relay for closing one of said start circuits, and chain circuits controlled by said operated relays for momentarily disabling the other line and hundreds relays from closing any start circuit.

9. Switching equipment as in claim 8 including a cutoff relay for each line circuit, means for operating the cutoff relay of said seized line circuit responsive to the extension of the speech circuit of said seized line circuit to said one register, and means responsive to said operation of said cutoff relay to re-enable said other line and hundreds relays to close their associated start circuits.

10. Switching equipment as in claim 6 including means in said register for registering impulses corresponding to the digits of the call number of a second one of said line circuits received over said extended speech circuit, digit counting means in said register for causing said impulse registering means to close a start circuit through an outlet magnet in a primary switch associated with said second line circuit and an outlet magnet in one of said secondary switches to said one connecting circuit and said one register as soon as the last digit has been received, said last named outlet magnets beng also operated in series in this circuit, means controlled by said impulse registering means and said last operated outlet magnets for operating an inlet selecting magnet in each of said last named primary and secondary switches, contacts closed by said last operated inlet selecting magnets for extending the speech circuit of said second line circuit through said last named primary and secondary switches to said one connecting circuit, and line-circuit-controlled means in said connecting circuit for interconnecting said extended speech circuits at said connecting circuit.

11. Switching equipment as in claim 10 including a power control relay common to said registers, means in said registers for operating said power control relay responsive to completion of the receipt of the digits of a call number, and means responsive to the operation of said relay for momentarily disabling all of the other registers and all of said line circuits from closing any start circuits.

12. Switching equipment as in claim 11 including means in said connecting circuit operated responsive to the closure of said start circuit associated with said second line circuit thereto for releasing said register, and means responsive to the release of said register for releasing said power control relay to re-enable said other registers and said line circuits to close start circuits.

13. Switching equipment for use in an automatic telephone system comprising line circuits, primary and secondary cross-bar switches, connectors, register-finder cross-bar switches and registers, outlet selecting and inlet selecting magnets for said switches, a line relay for each said line circuit, a start circuit for each said primary switch extending to a plurality of said outlet selecting magnets in a plurality of said switches, means responsive to the operation of any one of said line relays for energizing the start circuit of an associated one of said primary switches, means for causing said energized start circuit automatically to find a free path through said outlet selecting magnets in said one primary switch and one of said secondary switches, through a free one of said connectors, and through said outlet selecting magnets in one of said finder switches to a free one of said registers, certain ones of said selecting magnets operating in series in this path, contacts operated momentarily by said operated magnets and said operated line relay for operating corresponding inlet selecting magnets in said ones of said switches, automatic means for locking said operated inlet selecting magnets and releasing said operated outlet selecting magnets, cross-bar contacts closed by said operated inlet selecting magnets for extending a connection from said one line circuit through said switches and said connector to said register, and chain circuits for said switches to enable said start circuit to be completed through only one switch and one outlet selecting magnet in each rank of said switches.

14. Switching equipment as in claim 13 including means in said register for counting and storing impulses representing digits of the call number of a second line circuit received over said extended connection, with one means for storing the group selecting digits and a different means for storing the units digit, a tens relay for each ten line circuits, means in said register operated responsive to completion of the receipt of the digits of a call number for enabling said group digit storing means to operate one of said tens relays in accordance with the value of said group selecting digits, means responsive to said tens relay operation for energizing the start circuit of an associated primary swtich, means for causing said energized start circuit automatically to find a free path through an outlet magnet in said last primary switch and through an outlet magnet in one of said secondary switches and a switching relay in said one connector, said last named magnets and said relay operating in series in said circuit, contacts closed momentarily by said operated tens relay and said last operated primary switch outlet magnet for enabling said units digit storing means to operate the primary switch inlet magnet corresponding to the received call number, other contacts closed momentarily by said last primary switch outlet magnet for operating the corresponding inlet magnet in said last secondary switch, cross-bar contacts closed by said last operated inlet magnets for extending a connection from said second line circuit through said last named switches to said one connector, means responsive to the operation of said connector switching relay for locking said operated inlet magnets and for releasing said one register, and means for disabling the others of said registers from energizing any start circuits between the completion of the receipt of said digits by said one register and said release of said one register.

15. Switching equipment as in claim 14 including a common control circuit having an individual relay for each of said registers and a common power control relay, digit counting means and a trigger relay in each of said registers, means responsive to the completion of the receipt of the digits of said call number by said one register for causing said digit counting means thereof to operate the corresponding individual relay, means responsive to the operation of said individual relay for operating said trigger relay in said one register, means responsive to the operation of said trigger relay for enabling the operation of said tens relay and said switch magnets from said one register, other means responsive to the operation of said individual relay for operating said power control relay, and means responsive to the operation of said power control relay for disabling the other individual relays momentarily.

16. Switching equipment for use in an automatic telephone system employing cross-bar switches having inlet and outlets selecting magnets, and including line circuits, trunk circuits, connector circuits and registers, line relays for said line and trunk circuits, start circuits for said switches, means responsive to the operation of any one of said line relays for energizing one of said start circuits, means for causing said energized start circuit to find a single series path through the outlet magnets of said switches and through an idle connector to an idle register, an inlet and local and trunk outlets for each said connector, means responsive to the completion of said start circuit for causing the inlet magnets of the affected cross-bar switches to extend a connection from the involved line or trunk circuit to said one connector inlet and through said connector to said one register, means in said register responsive to impulses representing digits of the call number of a second line or trunk circuit received over said extended connection for energizing a second start circuit, means for causing said last energized start circuit to find a single series path through the outlet magnets of said switches to said one connector, means responsive to completion of said last start circuit for causing the inlet magnets of said last affected cross-bar switches under the control of said register to extend a connection from the local outlet of said one connector to said second line circuit in case the received digits correspond to the call number of said second line circuit, and to extend a connection from the trunk outlet of said one connector to said second trunk circuit in case the received digits correspond to the call number of said second trunk circuit.

17. Switching equipment as in claim 16, including a local switching relay and an outward switching relay in said connector, means in said register for connecting said local switching relay into said last start circuit for operation thereover responsive to receipt of a local call number, and for connecting said outward switching relay into said last start circuit for operation thereover responsive to receipt of a trunk call number, means responsive to operation of said local switching relay for preparing a ringing circuit to said second line circuit, and means responsive to operation of said outward switching relay for preparing a clear metallic circuit to said second trunk circuit.

18. Switching equipment as in claim 16 including an outward switching relay and first and second local switching relays in said connector, means for operating said outward switching relay to extend a connection from said connector to said second trunk circuit, means for operating both of said local switching relays to extend a call from said connector to said second line circuit, means for operating only said first local switching relay in case said second line or trunk is busy, means responsive to the operation of said outward switching relay or said first local switching relay for releasing said register, and means responsive to operation of said first local switching relay alone for applying a busy signal to said inlet of said connector.

19. Switching equipment as in claim 16 including a digit counting device in said register, impulse responsive means in said register for advancing said device one step for each digit received, means responsive to the operation of said device in its last step for causing the energization of said last start circuit, said device being operated step by step to its last step responsive to the receipt of a local call number, and means in said register for operating said device in its last step responsive to receipt of a lesser number of digits in case said digits correspond to a trunk call number.

20. Switching equipment as in claim 16 including means in said register for storing received group selecting digits separately from received units digits, a tens relay for each ten line circuits and for each group of trunk circuits having a separate call number, means for operating one of said tens relays from said group digit storing means responsive to the completion of the receipt of any call number, means jointly controlled by said operated tens relay and said units storage means for operating the proper magnets of said last affected switches responsive to receipt of a local call number, and means jointly controlled by said operated tens relay and said trunk circuits for operating the proper magnets of said last affected switches responsive to receipt of a trunk call number.

21. Switching equipment as in claim 20 including an idle test relay in said register, contacts on said storage means and contacts on said tens relays, means responsive to the receipt of a local call number for operating said idle test relay over a circuit passing through said contacts of said units digits storing means and said operated tens relay to the involved line circuit if idle, means responsive to the receipt of a trunk call number for operating said idle test relay over a circuit passing through said contacts of said group digit storing means and said operated tens relay to an idle trunk circuit in the involved trunk group, and means responsive to the operation of said idle test relay for completing the extension of the connection from said connector to said second line or trunk circuit.

References Cited in the file of this patent

UNITED STATES PATENTS

| | | |
|---|---|---|
| 2,468,300 | Maloney et al. | Apr. 26, 1949 |
| 2,587,817 | Busch et al. | Mar. 4, 1952 |
| 2,674,657 | Bellamy et al. | Apr. 6, 1954 |
| 2,735,893 | Le Gourrirre | Feb. 21, 1956 |